(12) United States Patent
Popescu et al.

(10) Patent No.: US 6,756,993 B2
(45) Date of Patent: Jun. 29, 2004

(54) METHODS AND APPARATUS FOR RENDERING IMAGES USING 3D WARPING TECHNIQUES

(75) Inventors: Voicu Popescu, West Lafayette, IN (US); Anselmo Lastra, Chapel Hill, NC (US); John Eyles, Chapel Hill, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 132 days.

(21) Appl. No.: 10/052,189

(22) Filed: Jan. 17, 2002

(65) Prior Publication Data

US 2002/0180748 A1 Dec. 5, 2002

Related U.S. Application Data

(60) Provisional application No. 60/262,438, filed on Jan. 17, 2001.

(51) Int. Cl.[7] .................................................. G09G 5/00
(52) U.S. Cl. ...................... 345/646; 345/422; 345/423; 345/581; 345/609; 345/647; 382/173; 382/300
(58) Field of Search ......................... 382/300; 345/609, 345/646, 647

(56) References Cited

U.S. PATENT DOCUMENTS

| | | | | |
|---|---|---|---|---|
| 6,061,477 A | * | 5/2000 | Lohmeyer et al. | 382/300 |
| 6,580,425 B1 | * | 6/2003 | Zwicker et al. | 345/420 |
| 6,608,631 B1 | * | 8/2003 | Milliron | 345/647 |

OTHER PUBLICATIONS

Popescu, Voicu et al., "The WarpEngine: An Architecture for the Post–Polygonal Age", Proceedings of SIGGRAPH 2000, Jul.;□□pp. 1–10.*

Popescu, Voicu et al., "High Quality 3D Image Warping by Seperating Visibility from Reconstruction", TR99–017 Computer Science Department, University of Noth Carolina at Chapel Hill; pp. 1–6.

Popescu, Voicu et al., "The WarpEngine: An Architecture for the Post–Polygonal Age", Proceedings of SIGGRAPH 2000; pp. 1–10.

McMillan L. and Bishop G., "Plenoptic Modeling: An Image–Based Rendering System", Proc. SIGGRAPH '95, pp. 39–46 (1995).

* cited by examiner

*Primary Examiner*—Matthew C. Bella
*Assistant Examiner*—Antonio A Caschera
(74) *Attorney, Agent, or Firm*—Burns, Doane, Swecker & Mathis, L.L.P.

(57) ABSTRACT

Methods and apparatus for rendering images are presented. The method includes the step of segmenting at least one reference image in a reference image space into a plurality of tiles, each tile defined by a corresponding set of image samples. The connectivity of each of the samples is determined based on the relative curvature of a surface of the corresponding tile at the sample coordinates. Color and depth information between adjacent, connected samples is bi-linearly interpolated to form a corresponding set of sub-samples. The set of sub-samples are warped from the reference image space to a destination image space. A final pixel color for each of a plurality of groups of sub-samples in the destination image space is computed as a weighted average of the color information of the sub-samples for each respective group. The final pixel colors are combined to render a final image in the destination image space from the at least one reference image.

35 Claims, 28 Drawing Sheets

WarpEngine - block diagram

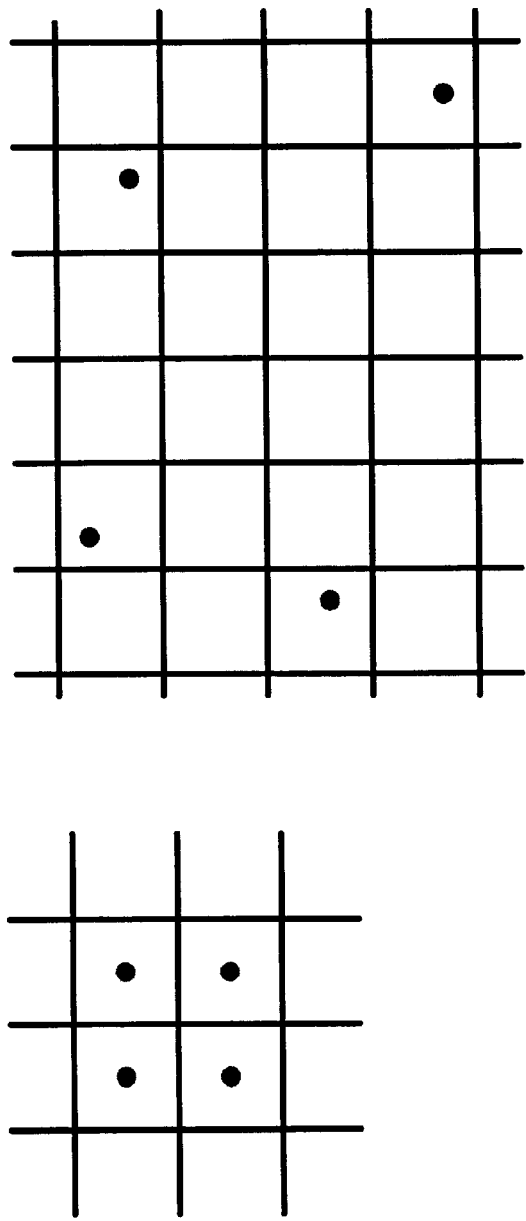

Triangle-mesh method desired image reference image

Triangle-mesh method reference image desired image

Surface continuity maintained - 2 triangles / sample reference image desired image

Classic rasterization - evaluate at predefined locations model    desired image

Classic rasterization - backward mapped model ⟵ desired image

Classic rasterization setup - compute parameter plane

Compute plane normal

Compute plane equation $n_a x + n_b y + n_c z + D = 0$

Evaluate parameter at predefined locations

IBR by Warping (IBRW)

- $(u_2, v_2)$ given by the 3D warping equations

Forward rasterization - subsamples independent of grid model ⟶ desired image

**Alternative method - *forward rasterization***

Forward rasterization reference image desired image

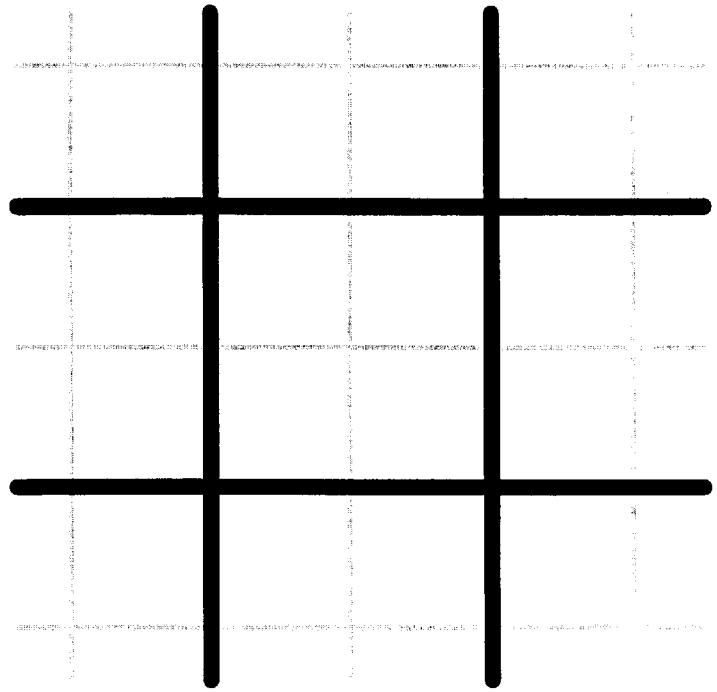
FIG. 7A  Supersampled warpbuffer — 4 color-samples per pixel

After visibility stage

1 color sample per warpbuffer location

Conservative computation of interpolation factor

Conservative computation of interpolation factor

Conservative computation of interpolation factor

Conservative computation of interpolation factor

Truncation error

Offsets two 2-bit offsets locate samples with 1/8 pixel accuracy

Offset reconstruction $$S = \frac{S_1 \cdot w_{1,1} + S_2 \cdot w_{2,5} + S_3 \cdot w_{0,9} + ... + S_{16} \cdot w_{15,15}}{w_{1,1} + w_{2,5} + w_{0,9} + ... + w_{15,15}}$$

WarpArray Architecture

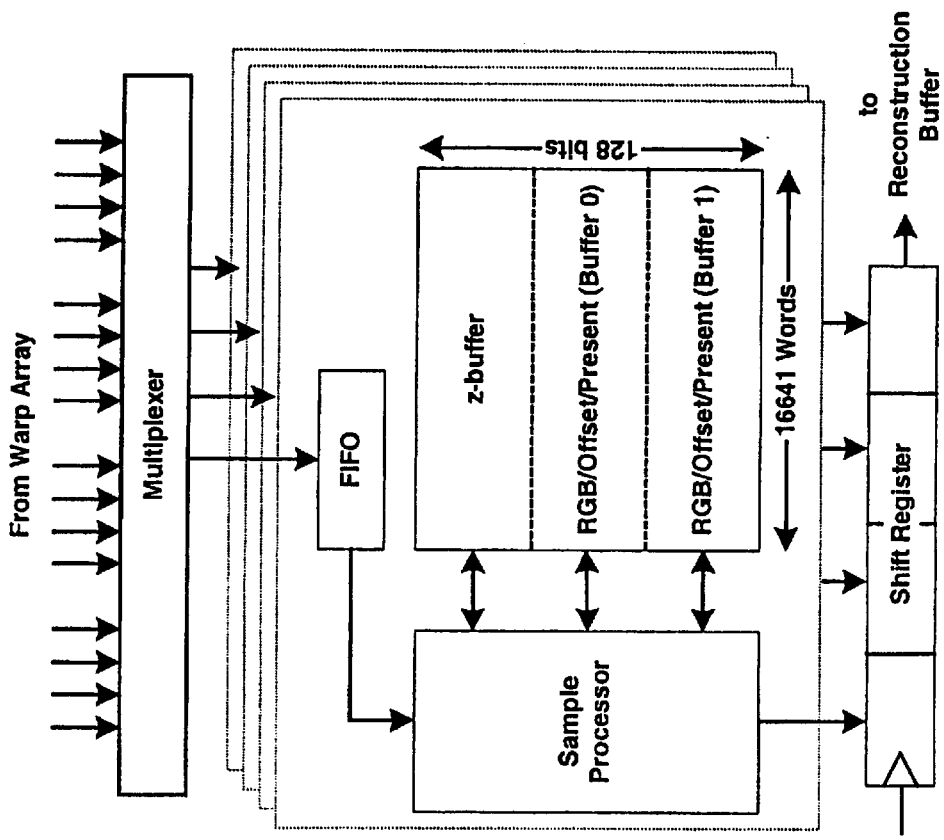
FIG. 13 Region Accumulator

METHODS AND APPARATUS FOR RENDERING IMAGES USING 3D WARPING TECHNIQUES

CROSS-RELATED APPLICATIONS

This application claims priority under 35 U.S.C. §119 to U.S. Provisional Application No. 60/262,438, entitled "Method for high-quality warping of images with depth by separating visibility from reconstruction", filed on Jan. 17, 2001, the entire content of which is hereby incorporated by reference.

STATEMENT REGARDING FEDERALLY-SPONSORED RESEARCH OR DEVELOPMENT

This work was supported by the National Science Foundation and the U.S. Army under Grant Numbers MIP 9612643 and DARPA E278, respectively. Accordingly, the US. Government may have certain rights in the invention.

BACKGROUND

The present invention is related to methods and apparatus for rendering images, and more particularly to methods and apparatus for rendering images using 3D warping techniques.

An important task in the field of computer graphics involves the creating (or rendering) of new images of a 3D scene using reference information that describes the scene. Rendering methods are generally classified into two groups: geometry based rendering (GBR), and image based rendering (IBR). Using GBR, 3D images are generated by projecting scene information as if being projected from various view positions. The projected scene information may include parameters such as geometric modeling data, surface properties, and lighting parameters of the scene.

Nearly all conventional computer graphics systems use some form of GBR to render 3D images. Using GBR, the data defining the 3D objects that comprise a particular scene are explicitly included in the graphics system, making it a relatively simple task for the graphics system to manipulate the scene objects. As such, GBR-based systems excel at data-manipulative tasks such as moving the desired viewpoint of a 3D scene, and simulating a phenomenon known as collision detection. GBR-based systems, however, have a limited ability to represent complex shaped objects, or objects that include micro-structure. As a result, it is difficult to construct a photo realistic virtual environment using GBR.

IBR provides a solution to this problem. Rather than defining a scene using geometric modeling data, IBR-based systems use actual scene images (or reference images), taken at various viewing positions, to render the desired 3D image. A typical IBR process flow is shown in FIG. 1. Novel images (i.e., images different than the original reference images) are generated by first warping, or transforming the reference image data to the novel image space. The warped reference images are then blended together to render the desired 3D scene. It is unpractical to consider all the samples of the different reference images to render the novel image. Instead, a subset of samples must be determined that will suffice for rendering an image of sufficient quality. Ideally, the number of samples in such a set should depend only on the number of pixels in the desired image and not on the overall scene complexity.

IBR offers several advantages over GBR. First, IBR avoids the often tedious and time consuming task of modeling (or sampling) an object to form the modeling database. IBR-based systems are instead capable of directly accepting the captured image data of the various reference images into an image database. Second, the complexity of the IBR algorithms are generally independent of the complexity of the scene, allowing the viewpoint of complex 3D scenes to be changed interactively in real-time.

In addition to the reference image data, different approaches to rendering images using IBR may require additional information in order to adequately render the desired 3D scene. This additional information may include depth maps, viewing parameters, and correspondence information that interrelate the various reference image data. Typically, at least the additional depth information is needed for the warping process to produce acceptable results.

Although image-based rendering of 3D images by warping with depth information (IBRW) promises to produce images of much greater quality than GBR, until now, the only IBRW method that has approached this goal has been the so-called polygonal mesh method. Using the mesh method, reference images are first partitioned into a mesh of micro-triangles. After partitioning, the mesh is transformed (or warped) into a new image having the desired viewing position. The warped mesh is then fed to a polygon-rendering engine that renders the desired 3D image.

FIGS. 2A through 2D illustrate the rendering of images using the mesh method. First, as shown in FIG. 2A, the reference image samples are warped into the desired image space. As the samples are warped to the desired image space, they move apart from one other leaving "gaps" of image information that must be filled. To fill in this information, the four neighboring samples are connected with two triangles as shown in FIG. 2B. Once connected, the triangles are rasterized to create sub-samples between the warped image samples as indicated by the shading in FIG. 2C. As other samples are warped and the corresponding triangles rasterized, the continuity of the surface must be maintained. This is illustrated in FIG. 2D. On average, a "cost" of two triangles per sample may be assigned to the rendering method.

Using mesh IBRW systems, a high degree of image quality may be achieved through minute scan-conversion of the micro-triangles that comprise the mesh. Unfortunately, not all types of images may be rendered in this manner. For example, polygon-rendering produces unacceptable results when attempting to render multiple reference images, each having image data at redundant locations. Polygon-rendering of these multiple reference images causes the corresponding triangles at the redundant locations to interpenetrate and coincide. This, in turn, causes a flashing (or flickering) to occur in the image at the redundant locations as the image viewpoint is changed.

One solution to address the flashing problem is to pre-process the image data in order to build a single mesh. This eliminates any redundant triangles in the final mesh. The pre-processing, however, is not only difficult to perform, but can often be extremely time-consuming. The added delay needed to pre-process the mesh data can inhibit the ability to warp the image data and render novel images in real-time. In addition to the flashing problem, the setup up costs associated with the polygonal mesh approach using traditional polygonal rasterization limits the performance of mesh-based image rendering hardware.

FIGS. 3A through 3F illustrate the steps involved in performing the traditional triangle rasterization process. The process begins by defining locations in the image plane where parameters for rasterization are to be evaluated. Typically, these locations are defined to be the pixel centers for the various rasterization triangles as shown in FIG. 3A. In order to determine the parameter values at these particular image plane locations, a backward mapping from the desired-image plane to the surface modeled by the triangle as shown in FIG. 3B is needed. This backward mapping must be computed at setup, and can be quite time consuming and expensive, in terms of required computational power.

The time-consuming computations required to compute the backward mapping are illustrated in FIGS. 3C through 3F. The object of computing the mapping is to determine the corresponding parameter plane for each desired parameter. In the exemplary illustration shown in FIG. 3C, the desired parameter is z. The first step in calculation process is to compute the plane normal as the cross-product of the two difference vectors, $P_2-P_1$ and $P_3-P_1$. This computation is shown in FIG. 3D. The computed normal forms the plane equation $n_a x + n_b y + n_c z + D = 0$, shown in FIG. 3E, which is then used during rasterization to evaluate the parameter at the various pixel centers as shown in FIG. 3F.

As an example of the number computations required to perform the rasterization, assume that it is desired to render an image having a targeted resolution of 1280×1024 pixels. On average, samples will be warped twice at the desired resolution. Also, recall that polygon rendering requires on average that two mesh triangles be rendered for every warped sample. Thus, the average number of triangles, N, that must be rendered per second in order to sustain a frame rate of 30 Hz is:

$$N \approx 1280 \times 1024 \times 2 \times 2 \times 30 \approx 157 \, M \text{ triangles/sec}$$

Conventional graphics hardware is incapable of achieving this level of computational performance. Indeed, it is believed that it will be years before such sustained levels of graphics performance are achievable. Moreover, even when such levels of performance are achieved, rendering images in this fashion will still require more hardware than rendering images on a machine optimized for IBRW.

Yet another drawback of conventional IBR techniques is the number of reference image samples required for each frame. The number of reference images depends on the contents of the scene and on how the scene is modeled. On average, more than one reference image sample must be processed per desired image location. This is true because there are often surfaces that are redundantly captured in more than one reference image. In addition, there often exist surfaces captured in the reference images that are not visible in the desired image (i.e, the depth complexity of the image is greater than one). Also, there may be surfaces that are better sampled in the reference image than in the desired image that can lead to more than one visible sample per desired image pixel.

The existence of each of the above-described image conditions makes two input samples per output pixel a reasonable lower bound. Practically it would be difficult to use fewer than two samples. When using real-time depth-image updating (often referred to as "immediate mode"), the number of samples will be determined by the number, resolution, and update rates of the cameras used to capture the reference images.

At present, the most viable alternative to IBRW is the above-mentioned technique of simplifying the triangle meshes in order to reduce the polygon count. This technique promises to achieve the desired performance goals using conventional graphics hardware. Again, however, the amount of pre-processing required to obtain the simplified meshes make the technique not well suited to real-time depth updating.

Another commonly used IBRW method, different from the polygonal mesh method and popular in the area of volume rendering, is a technique known as splatting. With IBRW splatting, areas of a desired image influenced by warping are approximated into "splats" based upon the opacity and color of the warped pixels. Using volume rendering, the splats are blended in a front-to-back order. For IBRW, however, samples existing at varying depths must not be blended together. Instead, samples having greater depths should be overwritten by overlapping samples having lower depth values. Only those samples that exist on the same surface should be blended together. This can be a difficult task to achieve, as no information about the depths of the various surfaces exists in the IBRW database.

Although rendering images by splatting is faster than rendering images using the mesh method, the quality of the warped images produced by splatting quickly degrades as the viewpoint moves away from the reference image views. As a result, splatting is typically used only when polygon-rendering hardware support is unavailable, or when such hardware support is uneconomical to use.

To better understand the quality limitations associated with rendering images by splatting, it will be helpful to first discuss the two main tasks performed by conventional splatting algorithms: (1) resolving visibility, and (2) reconstruction.

The first task of resolving visibility involves identifying those warped samples that are visible in the new image space, and eliminating those warped samples that should be invisible in the new space. Invisible samples may, for example, belong to surfaces that are behind other opaque surfaces in the image. Consider, for example, a reference image that depicts a house where both the front side and the left side of the house are visible. If the viewpoint of the new image is directed at the right side of the house, the left side of the house should no longer be visible. Thus, resolving visibility in the above example would involve first categorizing the warped samples belonging to the left side of the house as being invisible, and then subsequently discarding these invisible samples from the final image database.

The second major splatting task of reconstruction involves first computing a color value for the centers of each of the pixels of those visible warped samples that comprise the new image space. Once computed, the color values are then used to blend the visible warped samples together to render the desired image. This second task may be referred to as "reconstruction/re-sampling", since the task directly re-samples the color values of the visible warped samples (at the center of the pixels) to blend the samples together, without having to form an intermediate continuous representation of the image.

Conventional splatting algorithms carry out the tasks of resolving visibility and reconstruction simultaneously. Applicants have observed that this approach leads to inefficiencies in the splatting process that impact the quality of the rendered images. For example, in order to properly resolve visibility, splats must be opaque so that top-surface samples completely overwrite back-surface samples when composited on one another. During reconstruction, however, the splats must be semi-transparent in order to properly blend the visible samples together to form the desired image.

As a consequence, the blending of the samples should not be started until after visibility in the new image space has been fully resolved. Blending the samples before completely resolving visibility would "contaminate" visible samples with information from back-surface samples that should not contribute any information to the final image.

It has also been observed that any underestimation in the size of the splat may allow back-surface samples to erroneously appear in the final image. To prevent this phenomenon from occurring, conventional algorithms ensure that splat sizes are overestimated (i.e., areas known not to be influenced by warping are nevertheless included in the defined splats.) This approach, however, adversely affects the reconstruction of the desired image, causing what should be visible samples to be incorrectly erased in the final image. This, in turn, leads to an undesirable aliasing of edges in the final image, and to high frequency textures being included in the final rendered image.

SUMMARY

Thus, rendering images by simultaneously performing the tasks of resolving visibility and reconstruction causes inefficiencies in the rendering process that impact the quality of the rendered images. It is therefore an object of the present invention to provide methods and apparatus for separating these two tasks by providing a IBRW technique that produces high-quality images without the need for powerful, but costly, polygon rendering hardware.

This and other concerns are solved by a method of rendering images, the method including the step of segmenting at least one reference image in a reference image space into a plurality of tiles, each tile defined by a corresponding set of image samples. The connectivity of each of the samples is determined based on the relative curvature of a surface of the corresponding tile at the sample coordinates. Color and depth information between adjacent, connected samples is bi-linearly interpolated to form a corresponding set of sub-samples. The set of sub-samples are warped from the reference image space to a destination image space. A final pixel color for each of a plurality of groups of sub-samples in the destination image space is computed as a weighted average of the color information of the sub-samples for each respective group. The final pixel colors are combined to render a final image in the destination image space from the at least one reference image.

According to another aspect of the invention, the set of sub-samples in the destination image space is Z-buffered prior to computing a final pixel color.

According to another aspect of the invention, the relative curvature of the corresponding segment at the sample coordinates is calculated by computing the second derivative of a generalized disparity of the sample defined as the ratio of the distance between a viewing position of the at least one reference image and the plane of the at least one reference image and the distance perpendicular to the plane of the at least one reference image between the viewing position and the sample.

According to another aspect of the invention, the second derivative of the generalized disparity of the sample is computed along four directions in the plane of the at least one reference image at the sample coordinates, the four directions including an E-W, a SE-NW, a N-S, and a SW-NE direction.

According to another aspect of the invention, when the computed second derivative of the generalized disparity of the sample exceeds a predetermined threshold, the sample is not connected to form the final image in the destination image space.

According to another aspect of the invention, the step of bi-linearly interpolating between adjacent, connected samples includes the step of selecting a connected sample. A linear segment between the connected sample and an adjacent, connected sample is divided to obtain at least one sub-sample. Linear segments between connected samples and adjacent connected samples, between connected samples and adjacent sub-samples, and between sub-samples and adjacent sub-samples are repeatedly divided to obtain sub-samples until a desired interpolation distance between sub-samples is achieved. Sub-samples are obtained at coordinates at or near the connected samples.

According to another aspect of the invention, each respective tile includes a plurality of quads, each quad defined by four adjacent, connected image samples.

According to another aspect of the invention, the set of sub-samples are warped from the reference image space to the destination image space into a warp buffer having at least two sub-sample locations for each of the two directions defining the destination image plane for each final image pixel.

According to another aspect of the invention, each of the warped sub-samples is stored in a respective location of the warp buffer with a pair of offset values of at least two bits each to further define the location of a sub-sample within the warp buffer location.

According to another aspect of the invention, sub-samples having offset values defining locations closer to the center of a final image pixel are assigned weights that provide a greater relative contribution of the sub-sample's color information to the final computed pixel color.

According to another aspect of the invention, each of the plurality of groups of sub-samples includes sub-samples located in the warp buffer within at least one pixel of a respective final image pixel.

According to another aspect of the invention, the weights used to define the relative contribution of the color information are defined by a function having a relatively smaller value at the corner of a two-by-two pixel neighborhood centered at a respective final image pixel, and increasing in value to reach a maximum value at the center of the respective final image pixel.

According to another aspect of the invention, the function is a raised cosine function having zeroes placed at the corner of a two-by-two pixel neighborhood.

It should be emphasized that the terms "comprises" and "comprising", when used in this specification as well as the claims, are taken to specify the presence of stated features, steps or components; but the use of these terms does not preclude the presence or addition of one or more other features, steps, components or groups thereof.

BRIEF DESCRIPTION OF THE DRAWINGS

The above and other objects, features, and advantages of the present invention will become more apparent in light of the following detailed description in conjunction with the drawings, in which like reference numerals identify similar or identical elements, and in which:

FIGS. 2A–2D illustrate the triangle mesh IBR method;

FIGS. 7A–7B illustrate the warp buffer used with forward rasterization;

FIG. 13 illustrates the architecture of the region accumulator.

DETAILED DESCRIPTION

Preferred embodiments of the present invention are described below with reference to the accompanying drawings. In the following description, well-known functions and/or constructions are not described in detail to avoid obscuring the invention in unnecessary detail.

3D Image Warping

Figure 4:
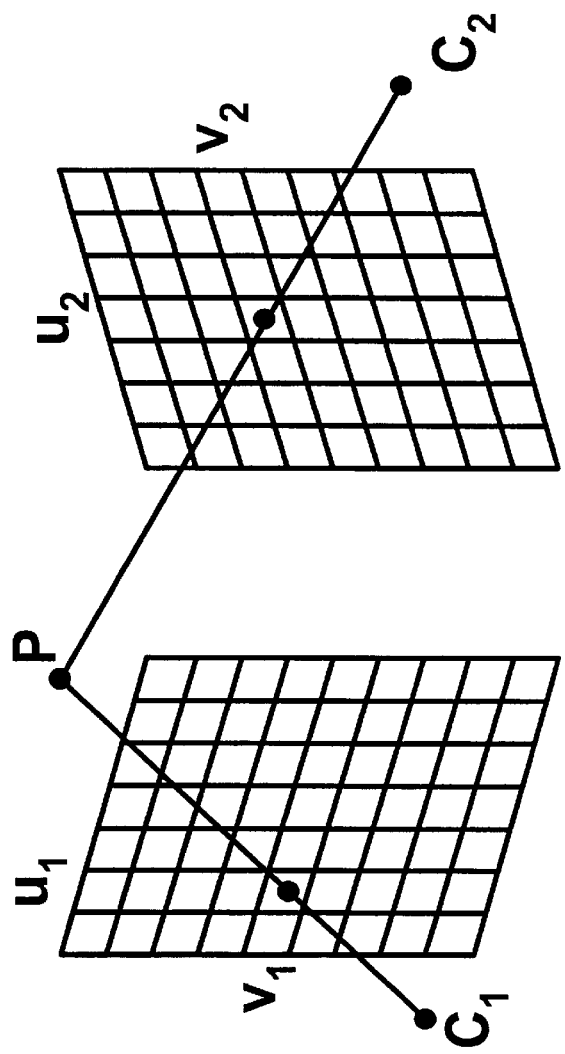
FIG. 4 illustrates mapping samples to the desired images using 3D warping equations.

It has previously been shown that the coordinates of a reference depth image sample in a desired (or warped) image may be computed using the following 3D warping equations:

$$u_2 = \frac{w_{11} + w_{12} \cdot u_1 + w_{13} \cdot v_1 + w_{14} \cdot \delta(u_1, v_1)}{w_{31} + w_{32} \cdot u_1 + w_{33} \cdot v_1 + w_{34} \cdot \delta(u_1, v_1)} \quad (1)$$

$$v_2 = \frac{w_{21} + w_{22} \cdot u_1 + w_{23} \cdot v_1 + w_{24} \cdot \delta(u_1, v_1)}{w_{31} + w_{32} \cdot u_1 + w_{33} \cdot v_1 + w_{34} \cdot \delta(u_1, v_1)}$$

where $u_2$, $v_2$ are the coordinates of a sample in the desired image space; $u_1$, $v_1$ are the coordinates of the sample in the reference image space; $w_{xy}$ are the transformation constants obtained from the reference and desired image camera parameters; and $\delta(u_1, v_1)$ is a generalized disparity at sample $(u_1, v_1)$, defined as the ratio of the distance between a viewing position of the at least one reference image and the plane of the at least one reference image and the distance perpendicular to the plane of the at least one reference image between the viewing position and the sample (also referred to as $z_{eye}$). See McMillan L. and Bishop G., "Plenoptic Modeling: An Image-Based Rendering System", Proc. SIG-GRAPH '95, pp. 39–46 (1995). FIG. 4 illustrates how the warping equations (1) may be used to map the sample at coordinates $(u_1, v_1)$ in the reference plane to the new coordinates $(u_2, v_2)$ in the desired image plane.

The warping equations (1) are similar to the vertex transformations commonly used in the art of computer graphics, with the exception of the added generalized disparity delta function used to encode the depth information of a sample. The equations (1) allow one to take advantage of the typically regular structure of images to perform incremental transformations. Each of the warped coordinates of a sample can be computed using six additions, five multiplications, and one division.

The Rendering Technique—Forward Rasterization

Figure 3A:
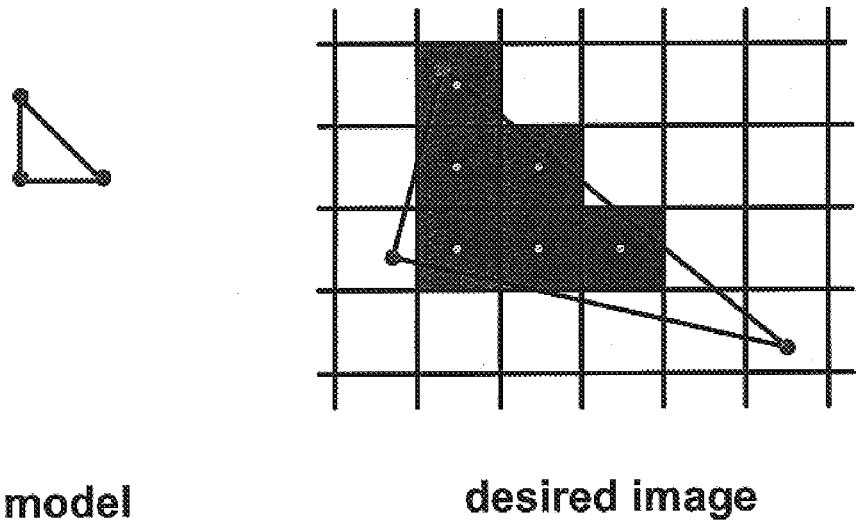
FIGS. 3A–3F illustrate the steps performed in traditional backward rasterization.
Figure 3B:
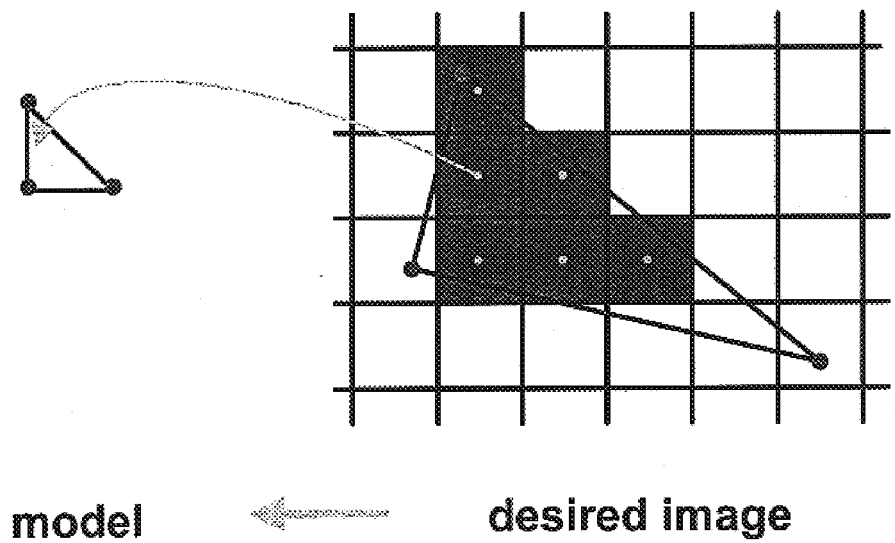
Figure 3C:
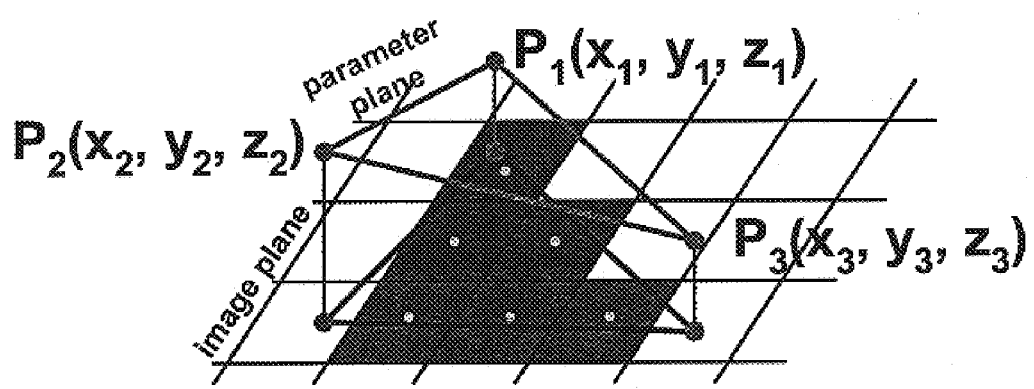
Figure 3D:
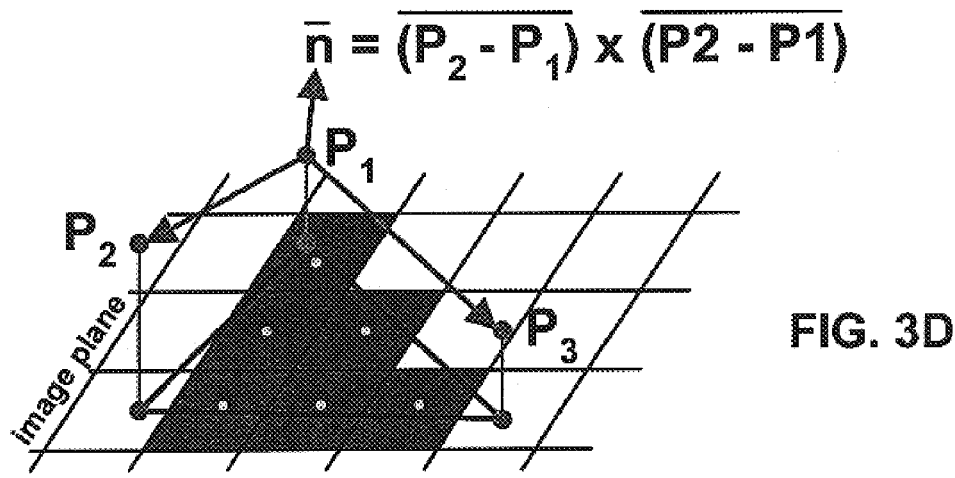
Figure 3E:
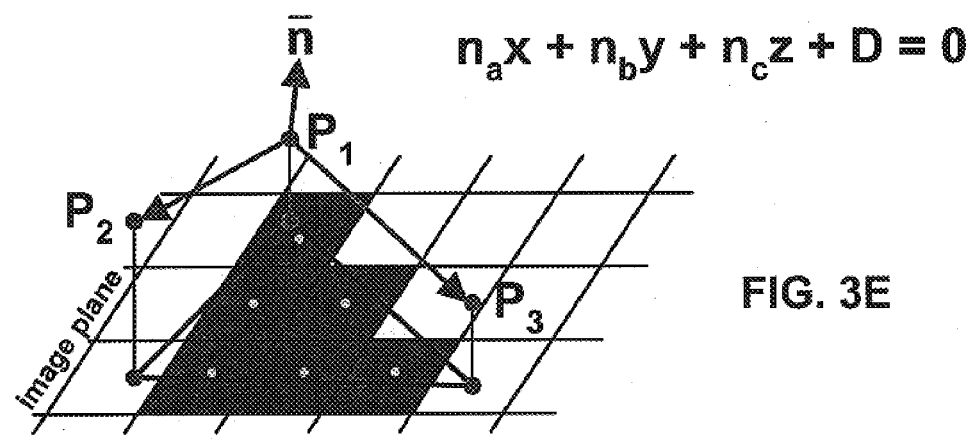
Figure 3F:
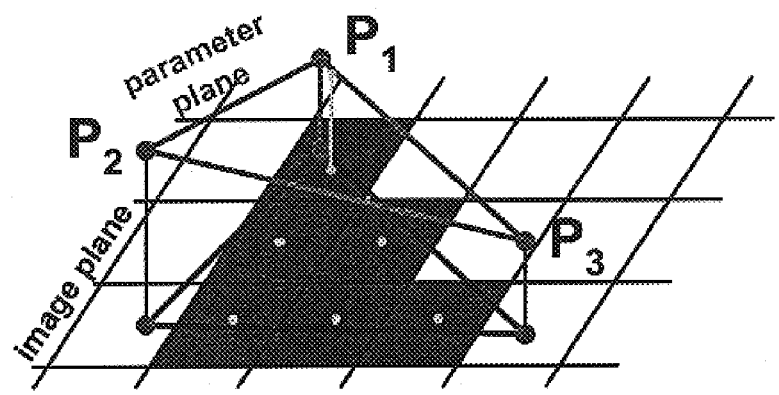
Figure 5:
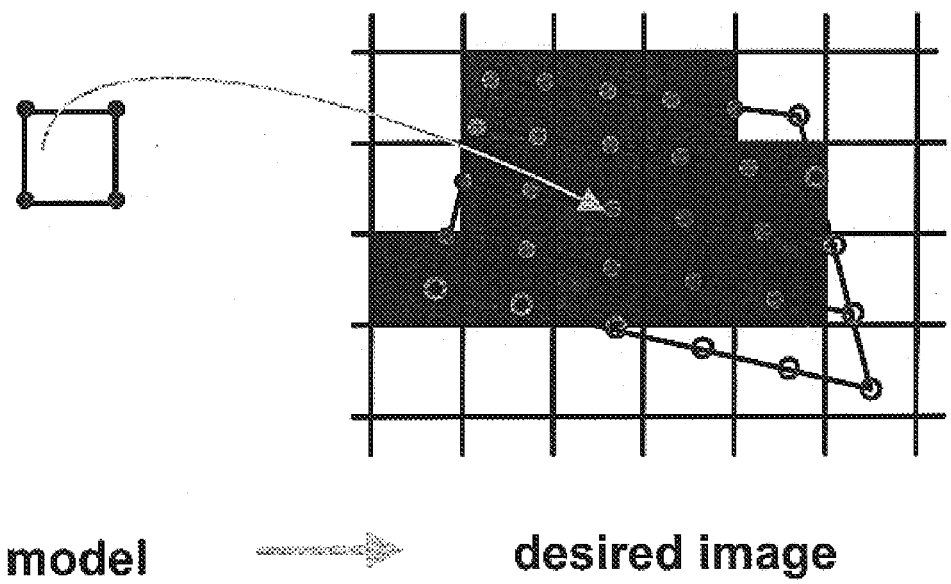
FIG. 5 illustrates the forward rasterization technique.

We now introduce a new technique for rendering images that overcomes the shortcomings of the conventional IBRW splatting and mesh rendering methods discussed above. The technique, illustrated in FIG. 5, performs a forward rasterization of the reference image data to form the final image in contrast to the traditional backward rasterization method depicted in FIG. 3B. With forward rasterization, the sub-samples that form the new image are independent of the desired image pixel grid, which has the advantage of cheaper setup. Tests have shown that compared to the traditional backward rasterization method (used with the mesh method), forward rasterization can require four times fewer arithmetical operations.

The new approach treats the depth image information as connected (as in the case of the traditional mesh approach) in order to prevent samples of hidden surfaces from showing through in the final image. We have observed that the triangles formed using the mesh method are relatively small in terms of actual screen space. This results in the image scan conversion time being dominated by the setup time. Instead of performing the scan conversion used in with the conventional mesh method, we propose simply bi-linearly interpolating between connected samples in the reference image domain to reduce the per-sample setup time.

To obtain a high-quality rendered image, it is important that several color samples be computed for each output pixel in the final image space. These color samples must then be blended together in order to obtain the final pixel value. While there is debate among those skilled in the art as to what an optimal number of required samples may be, it has been found that good quality images are obtainable using as little as five color samples per output image pixel. As an upper bound, it is generally agreed that using sixteen color samples per output image pixel is too costly to be used in practice.

As mentioned above, the two main tasks associated with IBRW are resolving visibility and reconstruction. Recall that resolving visibility involves the elimination of all samples that belong to a surface that would not be visible in the final image space. Reconstruction (or re-sampling), concerns the computation of the pixel colors that are to form the final image. It will now be described in greater detail how these tasks are accomplished using the forward rasterization rendering technique.

Resolving Visibility—Interpolation in a Continuous Parameter Domain

A first step in the task of resolving visibility is addressed in the forward rasterization technique by striving to maintain $C^0$ continuity among the surfaces that form the final image. This is similar to the approach used with the mesh method. Maintaining $C^0$ continuity ensures that surfaces in the final image space will be joined to one another. With the new technique, the expensive rasterization of two triangles per sample (referred to as traditional backward rasterization) is replaced with a less costly bi-linear interpolation of the samples. Two slightly different variants of the forward rasterization technique will now be described: interpolate-then-warp, and warp-then-interpolate.

According to a first exemplary embodiment, referred to as interpolate-then-warp, the new rendering technique includes the steps of:

1) for all adjacent, connected samples, bi-linearly interpolating color and depth to obtain sub-samples;
2) warping the resulting sub-samples to the desired image space; and
3) Z-buffer compositing the warped sub-samples into a warp buffer.

Figure 1:
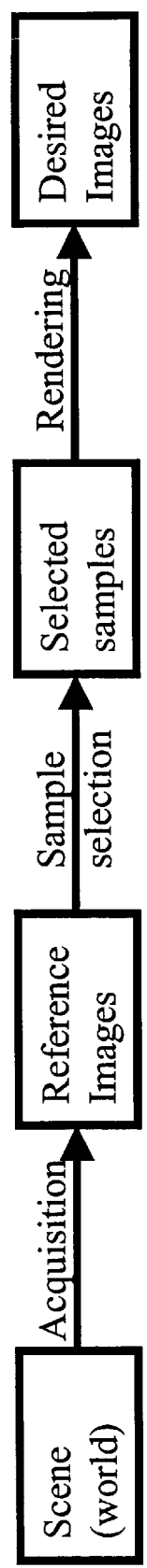
FIG. 1 is a block diagram illustrating the steps in performing IBR.
Figure 2B:
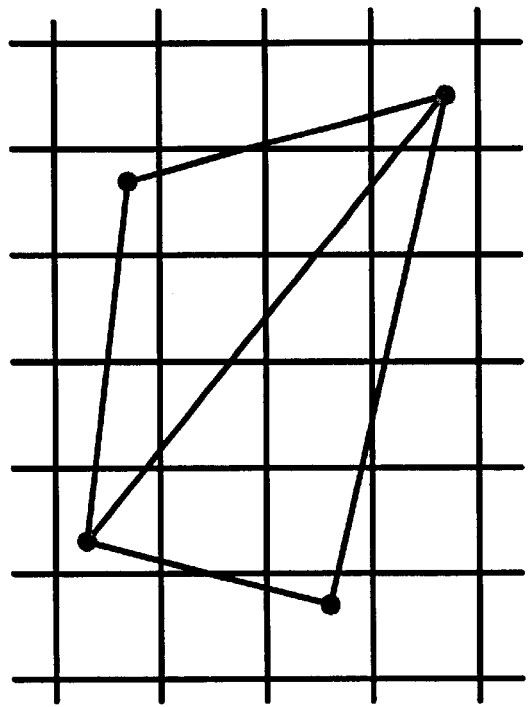
Figure 2B:
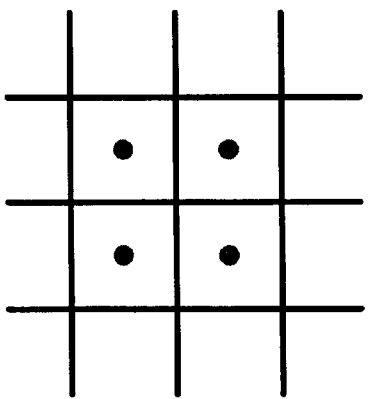
Figure 2C:
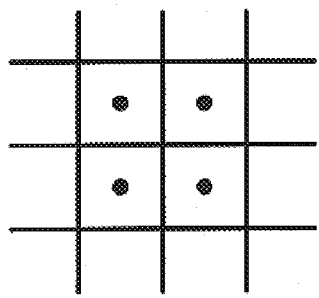
Figure 2C:
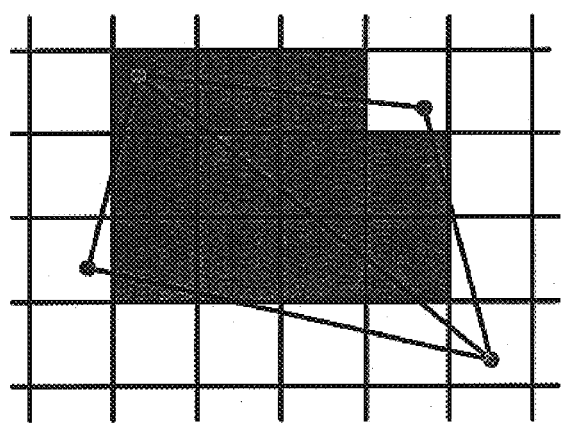
Figure 2D:
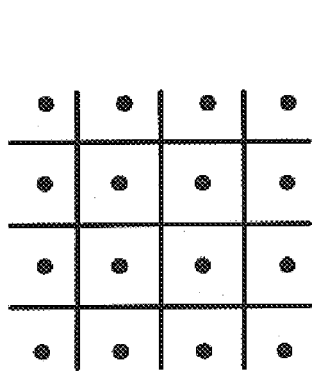
Figure 2D:
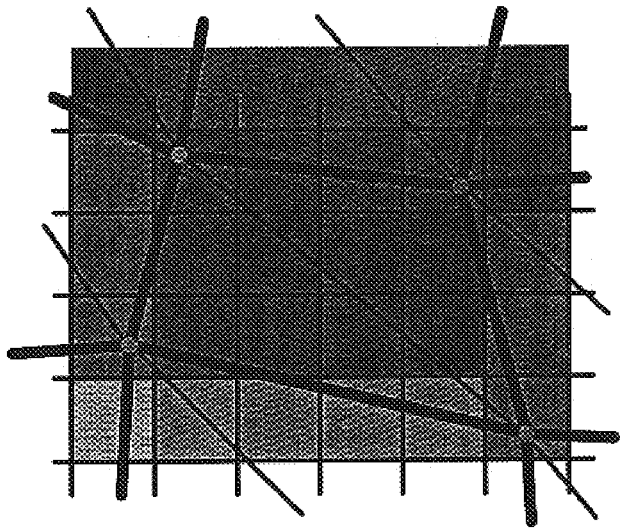
Figure 6A:
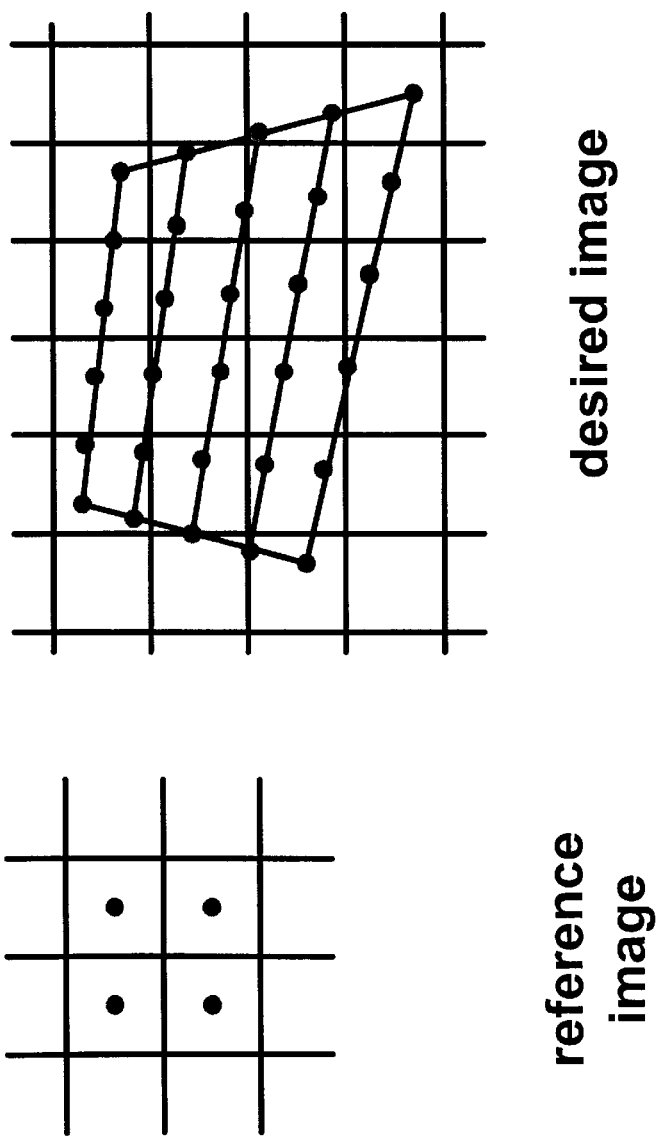
FIGS. 6A–6B illustrate the steps performed in forward rasterization.
Figure 6B:
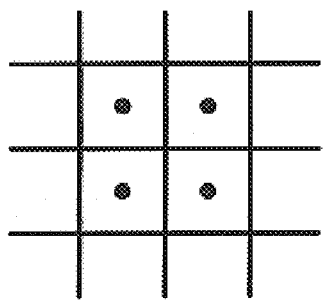
Figure 6B:
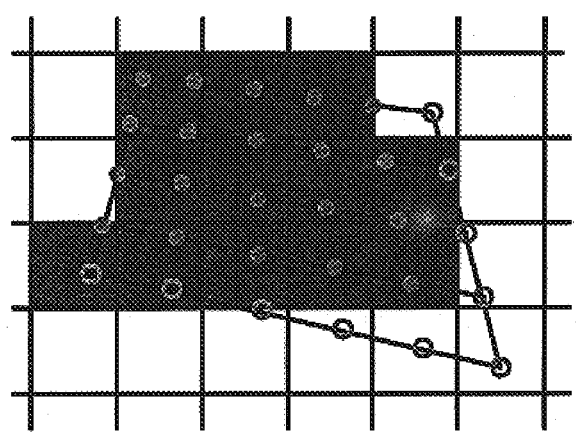

FIG. 6A illustrates how the sub-samples are formed by bi-linear interpolating between each of the adjacent, connected samples. The interpolation results in the rasterization of the quad defined by the connected samples as shown in FIG. 6B. This is comparable with the rasterization of the new image space by the micro-triangles formed using the polygonal mesh method as shown in FIG. 2B. An interpolation factor (i.e., the number of sub-samples created in each of the X and Y directions) should be chosen to ensure that back surfaces are not visible in the final rendered image, while being careful not to generate so many sub-samples that the computational requirements become unmanageable. The computation of the interpolation factor is described in greater detail below.

In order to reduce the amount of aliasing in the final rendered image, the interpolated sub-samples are warped into a sub-pixel resolution warp buffer. The warp buffer is used to store the minimum number of samples per pixel needed in the destination image space to properly reconstruct the final image. In order to accommodate several color samples for each final image pixel, a warp buffer having a higher-resolution than the final image is used to store the additional color samples.

Using a higher resolution warp buffer does not make the cost of warping more expensive—it merely changes some of the transformation parameters. A higher resolution warp buffer does, however, require higher resolution interpolation factors in order to cover more warp buffer locations. Good results have been obtained when the warp buffer was twice as dense, in each direction, than the final image. This arrangement allows for four color samples to be stored in the buffer per final image pixel. FIG. 7A illustrates a 2×2 super-sampled warp buffer. The bold lines in the figure delimit pixels, while the fine lines denote the warp buffer locations.

Figure 7B:
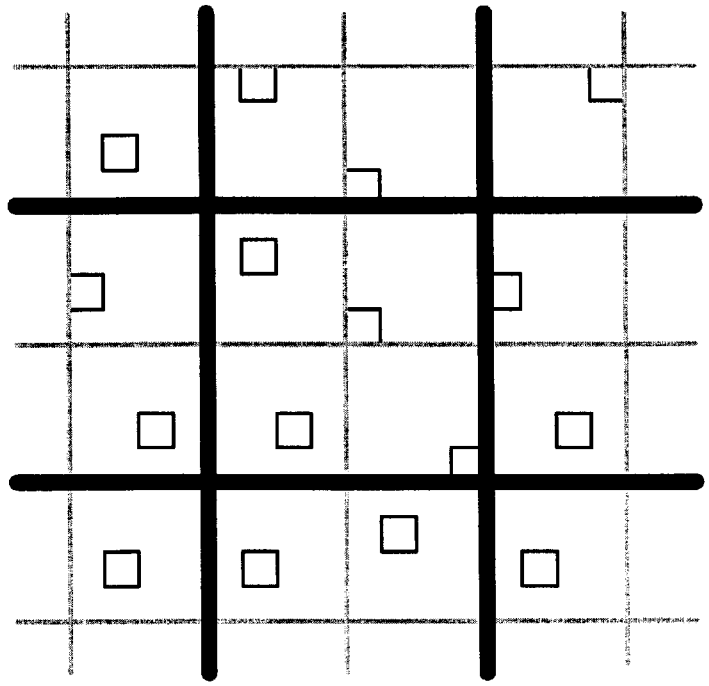

As shown in FIG. 7B, the samples are warped, interpolated and Z-buffered, so there is exactly one color sample at each warp buffer location. Z-buffering of the samples means that the position of the samples along the Z-axis, or the depth of the samples, are stored in the buffer along with color information of the samples. The samples stored into the warp buffer are then composited to produce the final rendered image.

Like the polygonal mesh method, bi-linear interpolation in depth is a first order approximation of the surface between the samples. Recall that in the 3D warping equations (1), the reference image depth information of a sample is represented as a generalized disparity $\delta$ that is inversely proportional to $z_{eye}$, which in turn is linear in the image space. Consequently, if the adjacent connected samples are planar, the sub-samples resulting from the interpolation of those samples will be correctly located on the same plane. If, however, the reference samples are not coplanar, the sub-samples will define a general bi-linear patch. Adjacent patches will nevertheless exhibit $C^0$ continuity.

According to an alternative embodiment of the rendering technique, referred to as warp-then-interpolate, the cost of warping the sub-samples (a process dominated by computing the 3D warping equations) is saved by warping the reference-image samples before performing the interpolation. Like the interpolate-then-warp technique described above, this alternative technique avoids the setup costs associated with the conventional method of rasterizing micro-triangles when rendering images using the mesh method. Just as when the interpolation is performed in the reference-image space, if the original samples are coplanar, the sub-samples will also be coplanar.

The similarity between the two techniques ends, however, when the original samples are not coplanar. In these situations, the quad formed in the new image space can be concave, which may different from the projection of the surface on reference plane causing the image to be distorted. Simulations have shown that this is a very infrequent case, and typically occurs between "silhouette samples" that would be not be connected to form the final image anyway. Although surface projections are better predicted using the previously described interpolate-then-warp technique, the increased accuracy comes at a higher computational cost.

Resolving Visibility—Determining Connectivity

A second important step in resolving visibility involves determining the connectivity of the reference samples. Determining connectivity is a process by which a determination is made as to which of the reference image samples should be connected, via interpolation, to form the final image. Continuity should be maintained only across each of the individual surfaces. Interpolating between the samples of two different surfaces can create an artificial surface in the final image. These artificial surfaces can hide surfaces that become visible between other surfaces that slide apart in the final image as a result of motion parallax. Connectivity may be determined based on depth continuity either by pre-processing the reference image data if available before rendering, or during the rendering process if the reference images are being acquired in real time. As such, the task of determining connectivity should be efficient enough so as not to adversely affect the rendering of images in real time.

In this spirit, we propose determining the connectivity of the samples based on the curvature of the surface being rendered. First, the square of the second derivative of the generalized disparity $\delta$ (see equation 1) is computed along the four directions E-W, SE-NW, N-S, and SW-NE, at each of the reference image sample coordinates. The result of the computation is used to determine whether or not the samples will be connected, via interpolation, in the final image space. If the sampled surface is planar, the computation will be exactly zero, and the sample should be connected to form the final image. If, however, the computation exceeds a predetermined threshold, the samples are marked as "disconnected", and do not contribute to the final scene image. Typically, the predetermined threshold will be scene dependent.

Special care must be taken when performing the computation on samples at the edges of the surfaces, especially when working with anti-aliased renderings. Anti-aliasing images introduces view-dependent information that cannot be used in other views. The color samples at the edges of a surface are a blend of the foreground and background surfaces. When the view changes, the foreground surface moves relative to the more distant background surface and blended samples of the background surface will make a silhouette of the foreground object incorrectly persist. What used to be the silhouette of the foreground object will also incorrectly be visible on the foreground object itself.

In order to prevent these artifacts one can discard the samples along the depth discontinuities, typically one or two samples along the edge of the surfaces. These discarded samples may be replaced with "good" samples (i.e., samples that do not exhibit the depth discontinuities of the discarded samples) from another view. If, however, the feature being rendered is too thin (e.g., one pixel wide), it may be that no "good" samples may be found in any of the nearby reference images.

Computation of the Interpolation Factor

An important step in the forward rasterization technique involves the selection of an interpolation factor. The continuity of the surfaces in the final image is ensured by determining an appropriate interpolation factor. In the case of traditional backward rasterization, all of the frame buffer locations that are covered by the image-plane projection of the polygon (or triangle) are guaranteed to get a sample of the polygon. In the case of forward rasterization, however, an interpolation factor that is too small can result in holes remaining in the surfaces of the final image. On the other hand, if the interpolation factor is too large, several sub-samples will be warped to the same warp buffer location, which is inefficient. Determining the minimum interpolation factor that guarantees that all of the warp buffer locations get at least one sub-sample is important to the success of the forward rasterization technique.

Figure 8A:
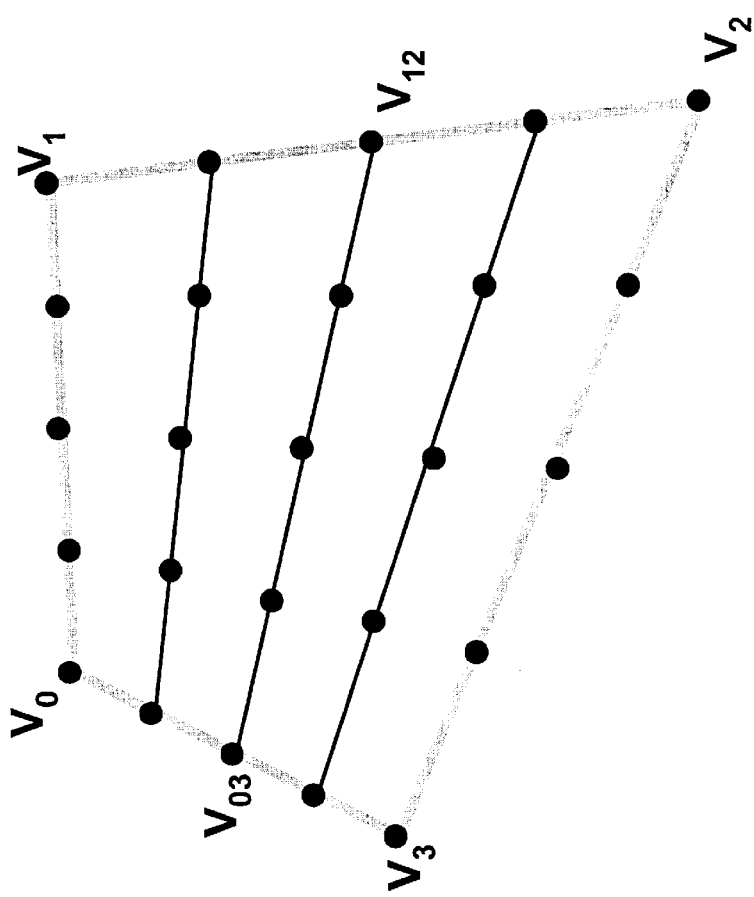
FIGS. 8A–8D illustrate the computation of the interpolation factor used with forward rasterization.

FIG. 8A illustrates an exemplary quad defined by four warped samples $V_0$ through $V_3$. The warped sample coordinates may be calculated using the 3D warping equations (1). The quad shown has been bi-linearly interpolated using an interpolation factor of 4×4. For example, the sub-sample $V_{03}$ may be obtained by dividing the linear segment between the samples $V_0$ and $V_3$. Similarly, the sub-sample $V_{12}$ may be obtained by dividing the linear segment between the samples $V_1$ and $V_2$. Next, the linear segment between sample $V_0$ and sub-sample $V_{03}$ may be divided to yield another sub-sample, and the process is continued until a sampling having the desired interpolation factor is achieved. The interpolation is performed in such a way that sub-samples are obtained at or near the quad boundaries as defined by the sample coordinates of samples $V_0$ through $V_3$. It will be understood that the dividing of linear segments may produce more than one sub-sample.

Figure 8B:
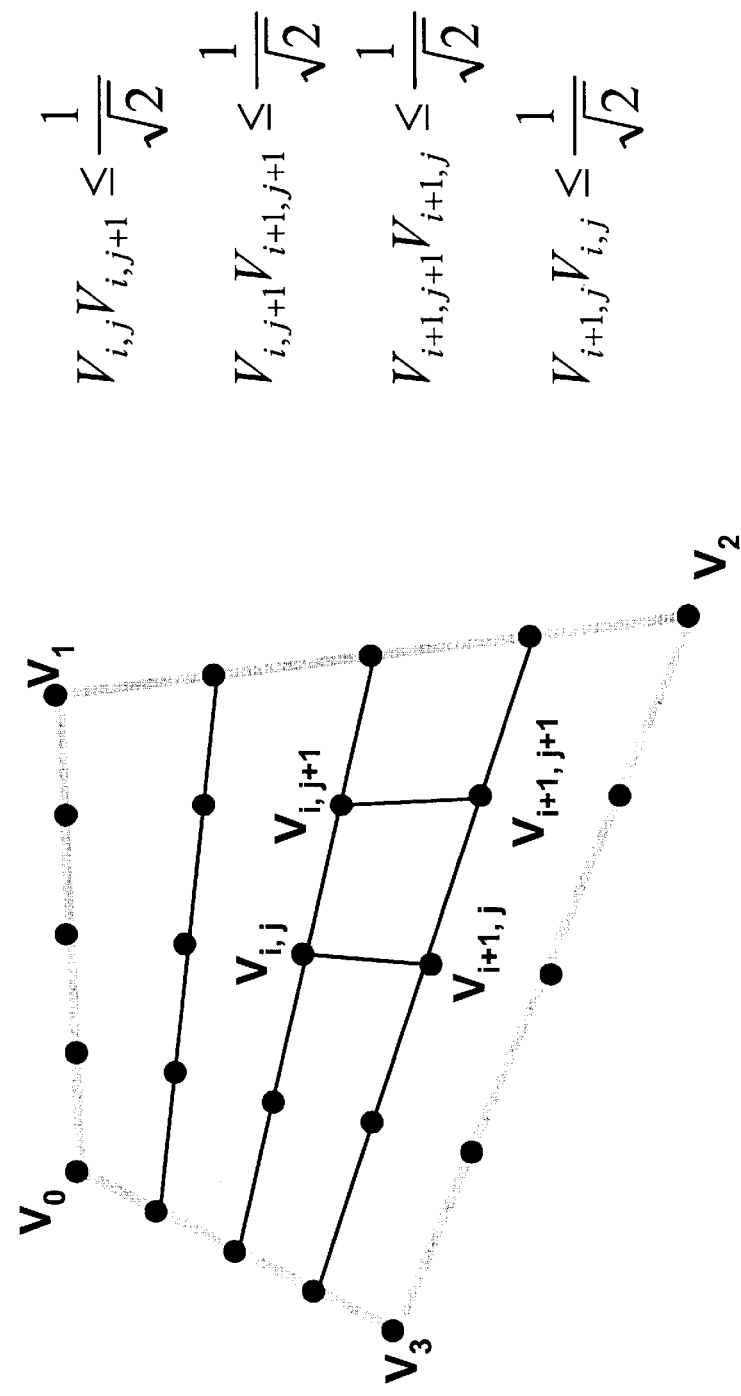

Referring to FIG. 8B, it may be shown that if the sides of the sub-quads defined by four neighboring sub-samples have a length shorter than 1/sqrt(2) pixels, every pixel within the quad is guaranteed to be selected. The reader is referred to the Ph.D. dissertation written by Voicu Popescu of the University of North Carolina at Chapel Hill, titled "FORWARD RASTERIZATION: A RECONSTRUCTION ALGORITHM FOR IMAGE-BASED RENDERING", Chap. 4, pp. 52–55 (Spring 2001), for the detailed proof of this claim.

Continuing with FIG. 8B, it may further be shown that the medial segment $V_{03}V_{12}$ is shorter than the maximum of the sides $V_0V_1$ and $V_2V_3$. See *Popescu*, pp. 52–55, for proof of this claim. It then follows that if the medial segment $V_{03}V_{12}$ is shorter than the larger of the segments $V_0V_1$ and $V_2V_3$, then the incremental segments along $V_{03}V_{12}$ will be at most as long as the incremental segments along the maximum of the two sides $V_0V_1$ and $V_2V_3$. Thus, one can subdivide a quad recursively into segments, such that any of the sub-segments along the interpolation lines will be shorter than the sub-segments along the maximum side of quad.

Figure 8C:
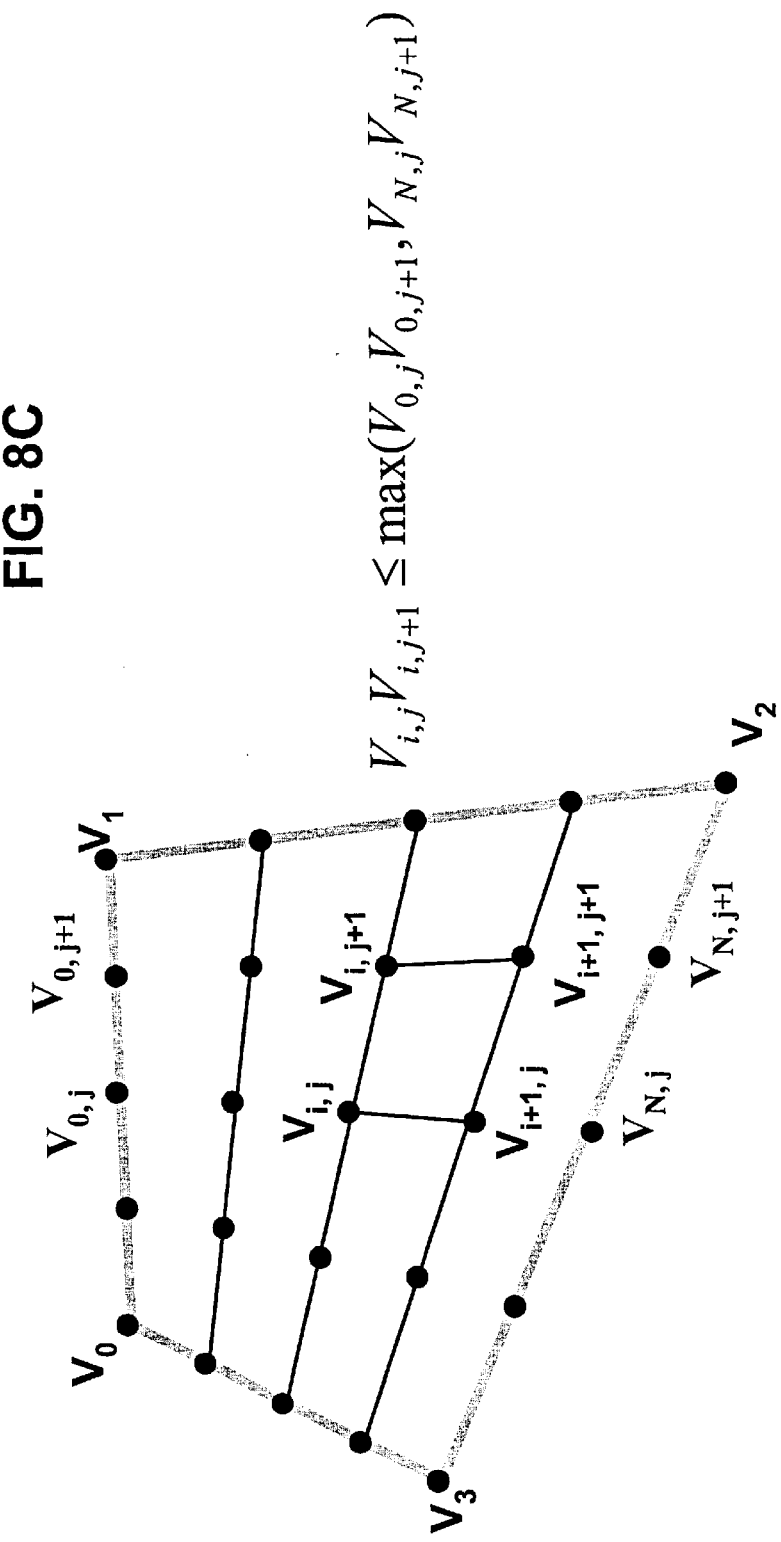
Figure 8D:
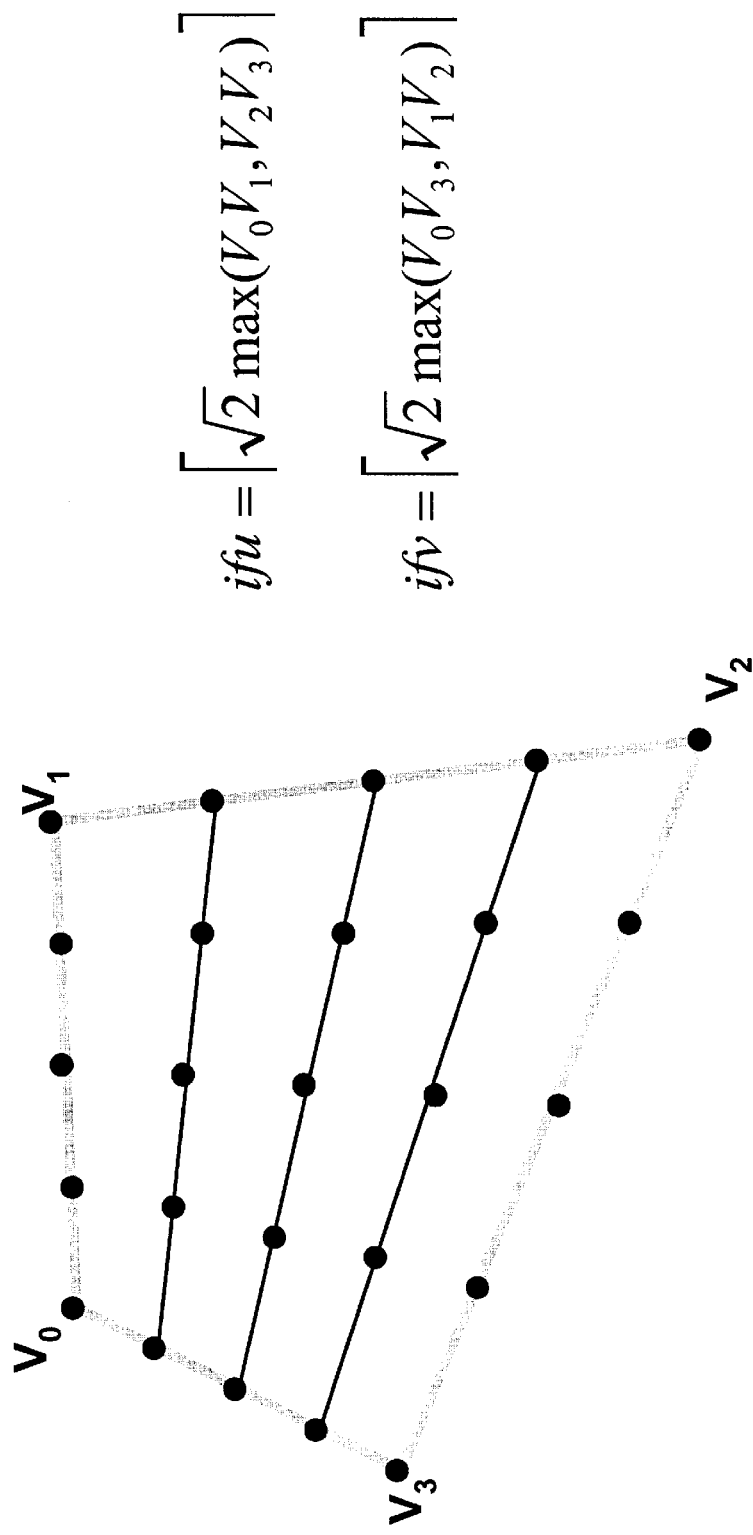

For example, FIG. 8C illustrates a generalized quad defined by the four samples $V_0$, $V_1$, $V_2$, and $V_3$ that has been bi-linearly interpolated. The sub-samples $V_{i,j}$, $V_{i,j+1}$, $V_{i+1,j}$, and $V_{i+1,j+1}$ represent a random sub-quad formed by four neighboring sub-samples generated by interpolation. It may be shown that the longest of $V_{i,j}V_{i,j+1}$ and $V_{i+1,j}V_{i+1,j+1}$ is at most as long as the longest of the sub-segments of $V_0$, $V_1$ and $V_2$, $V_3$. From this, the desired interpolation factors may be calculated from generalized expressions:

$$ifu = \lceil \sqrt{2} \max(V_0V_1, V_2V_3) \rceil$$

$$ifv = \lceil \sqrt{2} \max(V_0V_3, V_1V_2) \rceil \quad (2)$$

Reconstruction

Figure 9:
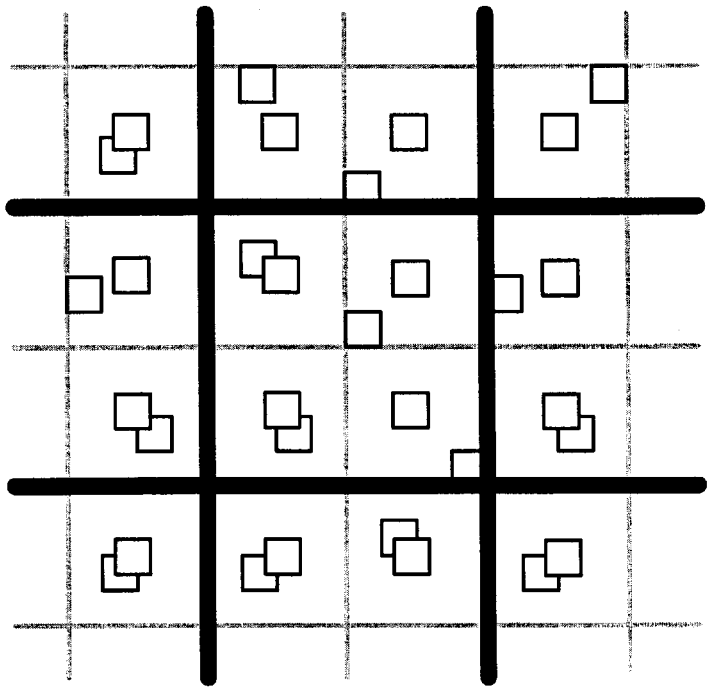
FIG. 9 illustrates the truncation error that may occur with forward rasterization.

The forward rasterization technique, by definition, does not produce sub-samples at precisely predefined image-plane locations. The sub-samples are warped to locations that are independent of the warp buffer locations grid, and these locations cannot be predefined. It is not sufficient, however, to merely truncate the warping result and assume that each sub-sample is warped to the center of a warp buffer location. Doing so produces noticeable aliasing in the final image as shown in FIG. 9. The aliasing occurs even when the warp buffer is defined to be twice the resolution of the final image in each direction.

Figure 10A:
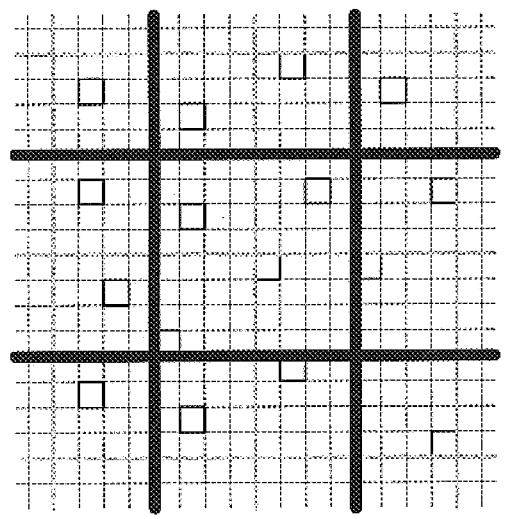
FIGS. 10A–10B illustrate the use of offsets and offset reconstruction.

A solution to this problem is to compute the location of each warped sample at a higher precision than the precision of the warp buffer itself, and then use this added information during the reconstruction process. This may be efficiently accomplished by utilizing a pair of "offsets" to further define the location of a warped sample within a respective warp buffer location. We have found that using two 2-bit offsets are sufficient to satisfactorily reduce the amount of aliasing present in the final image. The added warp buffer storage requirements are negligible. Moreover, the two bit offsets reduce the truncation error by locating the sub-sample within a quarter of warp buffer location, or one eighth of the final image pixel. FIG. 10A illustrates the 2×2 warp buffer of FIG. 7A with two 2-bit added offsets.

It is important to note that adding offsets to the warp buffer does not affect the forward rasterization process. Each warp buffer sub-sample generated by warping reference-image-interpolated sub-samples or by interpolating warped samples is Z-compared with the current closest sub-sample at a corresponding warp buffer location. If the new sub-sample is closer to the center of the warp buffer location, the Z value (or depth), offset, and color information for the location is updated. After all samples are warped and interpolated and all sub-samples are Z-buffered, the warp buffer colors and offsets are used to reconstruct the final image.

Figure 10B:
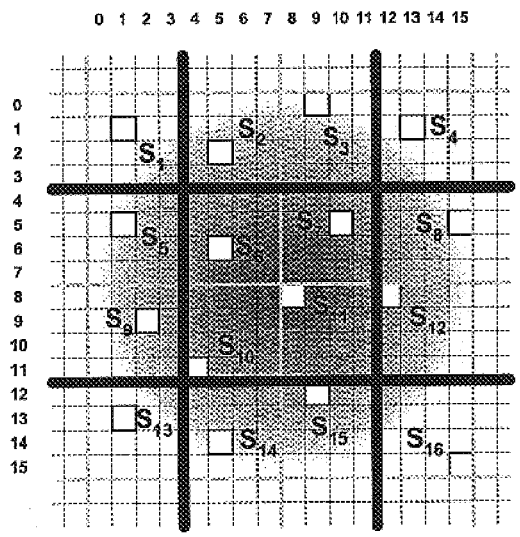

A populated warp buffer used for reconstruction is illustrated in FIG. 10B. Again, the bold lines in the figure delimit the final image pixel boundaries. The warp buffer is four-times more refined in each direction as a result of the added offsets. The offset values achieve a virtual super-sampling of the warp buffer (shown in the figure with dotted lines). There are four warp buffer locations inside each pixel (again shown with the thinner continuous lines), thus there are exactly four color samples available per pixel. The locations where the sub-samples S1 to S16 are mapped are recorded with two 2-bit offset values. The offsets may be numbered (not shown) in ascending order starting at the upper left corner of a warp buffer location in both the X and Y directions to the lower right corner of the warp buffer location from zero to three.

The final pixel color is next computed as a weighted average of the sub-samples that are mapped within a 2×2 pixel area centered at the center of the pixel of interest according to the following equation:

$$S = \frac{S_1 \cdot w_{1,1} + S_2 \cdot w_{2,5} + S_3 \cdot w_{0,9} + \ldots + S_{16} \cdot w_{15,15}}{w_{1,1} + w_{2,5} + w_{0,9} + \ldots + w_{15,15}} \quad (3)$$

Consequently, in the example presented in FIG. 10B, sixteen sub-samples are used to reconstruct the final pixel. The weights used to modulate each sub-sample's contribution depend on the corresponding offset values. For example sub-sample S11 (having offset values (0,0)) is assigned a much higher weight ($w_{8,8}$) than the weight ($w_{11,11}$) it would have been assigned if the sample had been mapped to the bottom right corner of the warp buffer location (having offset values (3,3)).

A preferred kernel used to perform the reconstruction (or re-sampling) stores 16×16 weights labeled 0–15 as indicated along the periphery of FIG. 10B. Only sixteen of the weights are used at each sample point. Not using all of the available weights has the effect of having to compute the inverse of the sum of the weights for each pixel. Computing the inversion, however, does not cause a significant performance-affecting burden when using integer weights. The great number of resulting possible sums make it impractical to store the results in a single lookup table. It would be possible, however, to form a collection of lookup tables that subdivide the sparse domain of possible sums into linear sub-intervals.

A preferred kernel shape to perform the reconstruction is a cosine function having two zeroes placed at the corner of the 2×2 pixel neighborhood. For integer weights, all of the weights are divided by the smallest weight. Experiments have shown that an acceptable balance between blurriness and aliasing in the final image is obtained when the cosine function is raised to the second or third power.

It will be understood that the use of offsets is not equivalent to having a higher warp buffer resolution. Although the location of a respective sample is recorded more precisely, only one sample is stored at each warp buffer location. In the expected case, when the sampling resolution of the desired image is within a factor of two of that of the reference images, a 2×2 warp buffer with 4×4 offsets provides for a good reconstruction of the final image. Outside these boundaries, other reference image samples should be used. One could increase the resolution of the warp buffer to accommodate even bigger sampling mismatches, but this comes at a substantial additional cost, not only in memory, but also in warping computational load since more reference image samples must be used.

The described technique of offset reconstruction has been shown to produce good temporal anti-aliasing properties. Anti-aliasing by jittered super-sampling or by coverage-mask-based methods suffer from the problem of having collinear sampling locations within a pixel. No matter how the sampling locations are chosen, at least two of the locations are collinear when employing jittered super-sampling, and k locations will be are collinear when k×k sub-pixel masks are computed. If from one frame to the next all collinear sampling locations move from one side to the other of a slowly moving edge, the change in color of the output pixel will be too abrupt. Using 2×2 pixel kernels, together with a 2×2 warp buffer and 4×4 offsets provides for sixteen intermediate levels when an edge moves slowly enough, producing a higher-quality moving image.

Hardware Architecture Overview

We have developed a hardware architecture for implementing the above-described forward rasterization technique (referred to as the WarpEngine) that provides sufficient warping power for all required reference-image samples and sufficient bandwidth to the warp buffer. It is preferred to partition the reference images into 16×16 sample tiles (with a 15×15 payload) and to use these times as the basic rendering primitive. Tiles provide several important advantages. First, portions of reference images can be selectively used as needed for adequate sampling and coverage of visible surfaces. Also, one can easily estimate the screen area a tile transforms to, enabling efficient high-level parallelism. Tiles are small enough that the same interpolation factor can be used for all samples, enabling Single-Instruction Multiple-Data (SIMD) low-level parallelism.

Warping and Interpolation Requirements

All of the samples of a tile can be warped and interpolated with the same set of instructions so a SIMD implementation is believed to be the most efficient. The architecture utilizes an array of simple byte-wide processors. For a computation that can be efficiently mapped, a SIMD array provides efficient use of silicon, since control is spread out over all the processors. A large array of simple processors is more easily programmable than a single complex pipelined processor. A SIMD array equal in size to the reference-image tile maps very efficiently since the warping calculation is the same for every pixel, with minimal branching required. Nearest neighbor processing element (PE) connectivity provides each PE with access to the three other samples needed for interpolation.

Warp Buffer Requirements

An important design concern in developing the WarpEngine architecture involves providing a sufficient amount of warp buffer bandwidth. For example, assuming a maximum resolution driven by the requirements of High-Definition television (HDTV) of approximately 2K×1K pixels and 60 Hz update rate, at least 240 million samples per second must be warped, assuming that one needs to use at least two reference-image samples per output pixel. Simulations have shown that a 2×2 warp buffer resolution in some cases requires an average interpolation factor of 4×4. Thus, for each warped reference-image pixel, sixteen warped samples are generated, and the warp buffer must process approximately 4 billion warped samples per second. Moreover, a typical sample is about twelve bytes in size (4 bytes RGB; 4 bytes Z-buffer; 4 bytes X and Y values, including offsets).

Assuming a depth complexity of two, and that fifty percent of the hidden samples initially pass the Z-comparison test, an average of ten byte accesses is required per warped sample. Thus the total warp buffer bandwidth requirement is about forty GigaBytes/sec. To achieve this warp buffer bandwidth, a very large number of commodity DRAMs may be required (well over 100). Moreover, the processors used to perform the warping and interpolation tasks would require hundreds of pins dedicated to interfacing with the warp buffer. By placing the warp buffer "on-chip", that is on the same application specific integrated circuit (ASIC) as the processors that generate the warped samples, very wide and fast memory interfaces can be employed.

Requirements for Region-based Rendering

With current technology, a single ASIC can provide neither sufficient processing power nor sufficient warp buffer memory. Thus multiple ASICs are required, in addition to some form of high-level processing parallelism. Partitioning the warp buffer into contiguous screen regions with each region being assigned to a respective ASIC (referred to as screen-space subdivision) is appealing, because a typical 16×16 sample tile intersects only one screen region. The tile therefore need only be processed by a single ASIC (tiles that overlap region boundaries are assigned to multiple regions).

In contrast, with interleaving, each tile would need to be processed by many or perhaps all of the available ASICs. For partitioning by screen-space subdivision, primitives must be sorted by screen region. Using tiles as the rendering primitive enables that sorting be performed on 256 samples at a time. The number of tiles per frame ranges from a few thousand to a maximum of a few tens of thousands (depending on screen resolution) so that the computational and memory burden of sorting is considerably less than the requirements for general polygon-rendering. By assigning multiple screen regions to each ASIC, a smaller number of ASICs is sufficient, however, this does require sorting into buckets corresponding to the various screen regions. This is true because an ASIC must process all primitives in a given region before moving on to its next assigned region.

Also, a "sort first, sort middle, sort last" approach developed to describe object-parallel polygon-rendering architectures can also be applied to IBR architectures. Sorting by reference image tiles is sort first from the point of view of reference image samples, since after a tile has been assigned to a screen region, it is known, a priori, that the tiles sub-samples will warp to the desired screen region. Those that do not may be discarded, since the tile will be assigned to all pertinent regions.

In polygon rendering, sort first is prone to load-balancing difficulties. This is not a problem for IBR, however, since reference image tiles and interpolation factors are chosen to sample the destination image uniformly. It is believed that sort first is an attractive approach for the WarpEngine implementation, because doing so makes scaling of the system relatively simple. Performance is increased by adding additional ASICs, and then assigning fewer screen regions to each ASIC. Screen-space subdivision requires a central processor, or host, which can perform the tile sorting, or a way of distributing these tasks across the multiple ASICs.

Processing Warped Sub-samples

It is straightforward to build a region-sized on-chip warp buffer with very high performance. Since each warped sample maps to only one location in the warp buffer, the warp buffer can be partitioned with a sample processor assigned to each partition. Very high numbers of samples can be processed by instantiating more sample processors, each processing simultaneous streams of warped samples. Load balancing can be achieved by sub-pixel interleaving the partitions and providing input first-in, first-out buffers (FIFOs) for the sample processors. The region size is determined by the silicon budget for the warp buffer independently of the number of partitions. The sample processors may also be simple in design. The processors combine a new warped sample with the previous contents of the warp buffer location using a Z-compare operation. Since the sample processors' memory interface need not cross chip boundaries, the interface can be very wide and very fast. Thus, the sample processors are not bandwidth limited.

WarpEngine Hardware Implementation

Figure 11:
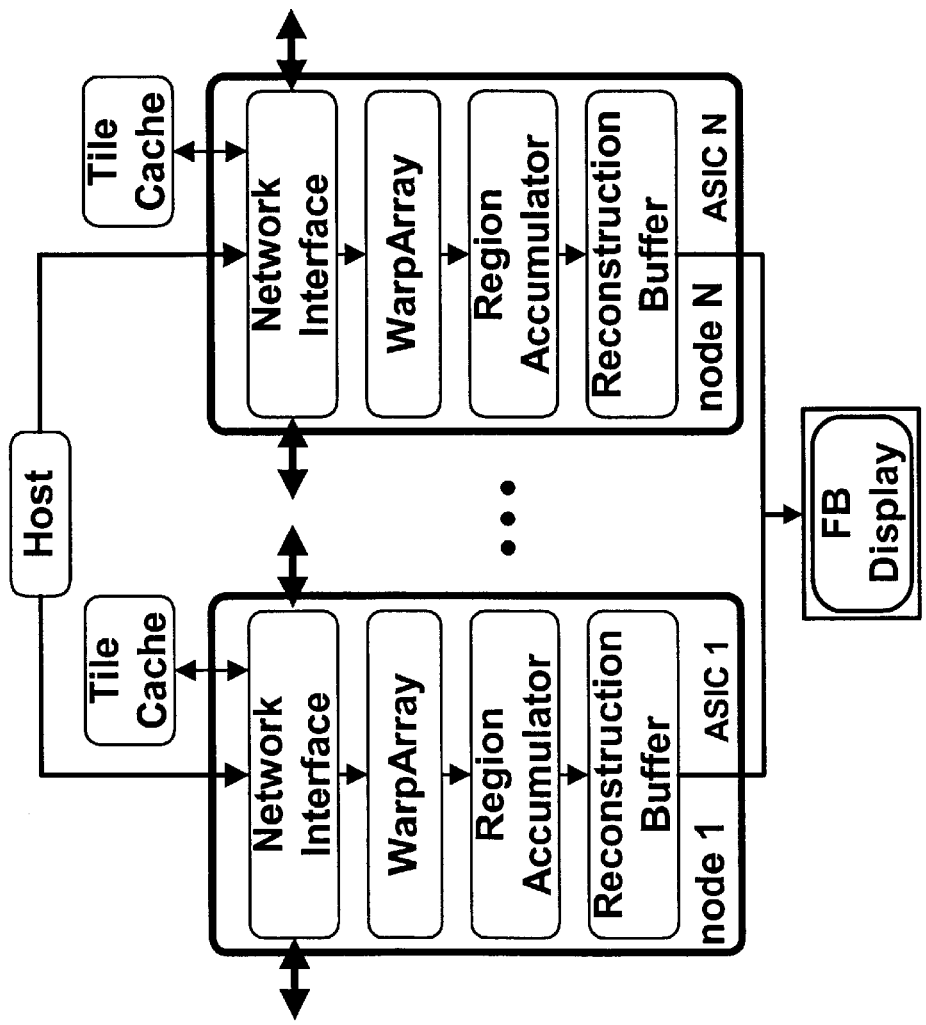
FIG. 11 is a high-level block diagram of the WarpEngine used to perform forward rasterization.

FIG. 11 show a high-level block diagram of a preferred embodiment for the WarpEngine architecture. The architecture includes one or more identical nodes (node 1 to node N). Typically four to thirty-two network connected nodes are included to from the overall WarpEngine. Each node includes both an ASIC and a tile cache. Each ASIC includes:

1) a 16×16 SIMD warp array for warping and interpolating reference image samples;
2) a region accumulator, which includes a double-buffered warp buffer capable of supporting a 128×128 screen region and four sample processors for resolving visibility;
3) a reconstruction buffer for computing final pixel values; and
4) a network interface, which connects the nodes together into a high-bandwidth ring, and which provides a connection to the host, a connection to each of the other warp arrays, and a connection to the node's respective tile cache.

The tile cache may be a commodity DRAM device. The cache is used for caching both reference image tiles and processing instructions. A double-buffered frame buffer (FB) receives the final pixel values from the nodes for presentation on the display.

The WarpEngine shown in FIG. 11 operates as follows. First, the host determines which reference image tiles are to be used to compute the destination image, and then computes a screen space bounding box for each of these tiles. For each screen region, the host maintains a bin that contains pointers to the tiles whose bounding boxes intersect that particular screen region. For each screen region, the host then assigns a node to be responsible for processing the screen region. The host then sends each tile in the region's bin to the assigned node. Tiles are cached in the node's respective tile caches. If a tile is resident in one of the caches, the host instructs the network interface to forward it to the appropriate node. If not, the host must send the tile data to the node.

Each tile received by each node is loaded into the warp array, which performs the warping and interpolation calculations for the tile, and forwards the warped samples to the region accumulator. The region accumulator collects the warped samples into its sub-pixel resolution warp buffer. After all tiles in the region's bin have been processed, the region accumulator then swaps its buffers and initializes its visibility buffer in preparation for processing the next screen region.

Concurrently with processing the next screen region, the region accumulator "steals" memory cycles to send the previous region's data to the reconstruction buffer. The reconstruction buffer computes the final pixel values for the region and forwards the pixel values to the Frame Buffer. After all regions have been processed and the corresponding final pixel values calculated and forwarded to the frame buffer, the frame buffer swaps buffers.

The arrangement can function in a "retained mode", in which there is a fixed set of reference images describing an environment, or in an "immediate mode", in which new reference images are being received in real-time.

Warp Array Implementation

Figure 12A:
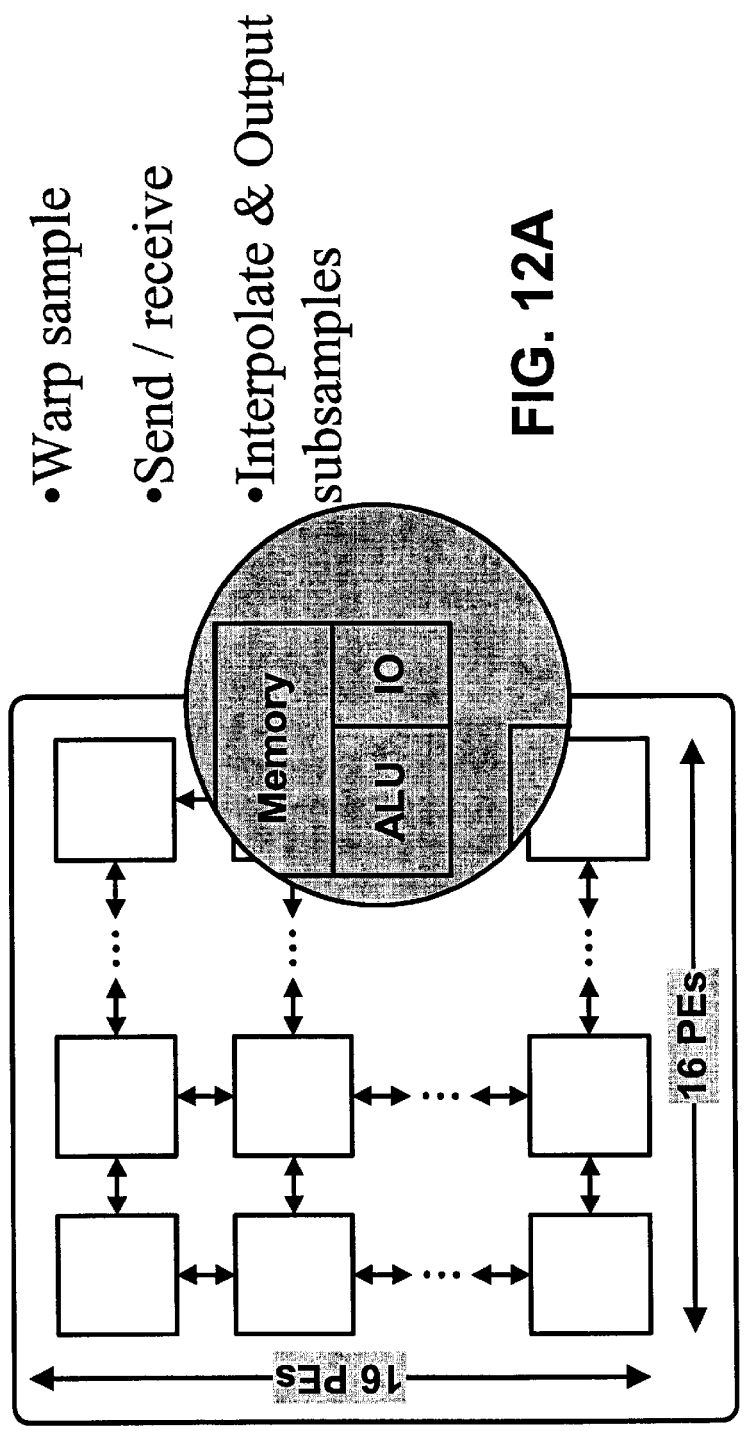
FIGS. 12A–12B illustrates the architecture of the warp array.

A high-level block diagram of the warp array and the functions the array performs is shown in FIG. 12A. The warp array includes 256 PEs arranged as a 16×16 pixel array. Each PE includes a simple byte-wide arithmetic logic unit (ALU) and 160 bytes of local memory. The local memory is partitioned as: 128 bytes of main memory, sixteen bytes of I/O buffer, and sixteen bytes of sample buffer.

Figure 12B:
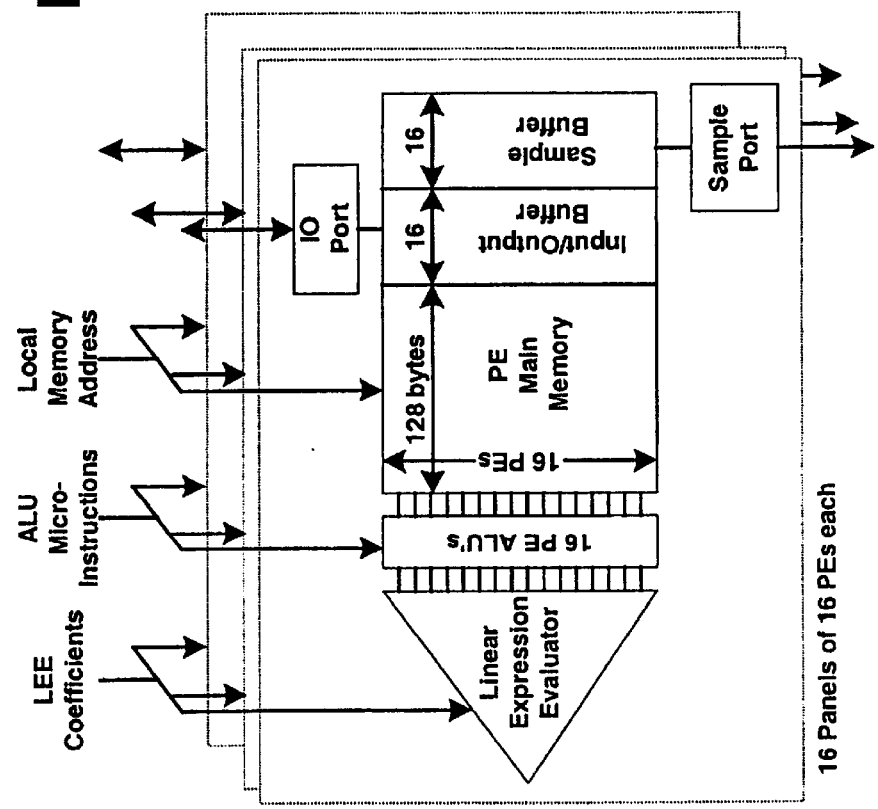

A more detailed diagram of the warp array is shown in FIG. 12B. A distributed linear expression evaluator provides values of the linear expression Ax+By+C to each PE simultaneously, in byte-serial form (x and y represent the position of the PE in the 16×16 array). The evaluator is used to achieve very fast computations of the linear part of the numerator and denominator of the 3D warp equations (1). Each PE includes a byte-wide connection to its neighbor in each dimension. The clock rate for the PE and local memory is preferably at 300 MHZ or higher. The I/O buffer is used for inputting reference image tiles (from either the tile cache or host via the network interface) via a 300 MByte/sec interface. The sample buffer is used for exporting warped samples to the region accumulator over the sample port via an on-chip 4.8 GigaByte/sec interface. Access to these buffers may occur simultaneously by accessing the main memory from the ALU such that the next tile may be loaded during processing of the current one. This also allows one set of interpolated samples to be computed while the previous set is being output to the region accumulator.

Region Accumulator

FIG. 13 provides a detailed diagram of the region accumulator. The accumulator includes a SRAM warp buffer (referred to as a region buffer) and a set of four sample processors that combine warped samples into the region buffer memory. The region buffer includes data for a 128×128 screen region at 2×2 sub-pixel resolution. A half-pixel wide boundary is added to allow reconstruction kernels of up to two pixels in width. The region buffer is partitioned into four sections that are interleaved 2×2 across the sub-pixel grid. Each word of the region buffer memory is divided into three fields.

Two double-buffered fields (labeled RGB/Offset/Present) include RGB values, the offsets used for reconstruction, and a present bit used to avoid Z-buffer initialization. One of the buffers is used for accumulating samples for the current region, while the other buffer contains the previous region's values for output. The third field contains values that are not required for reconstruction, and thus need not be double-buffered.

Besides the Z value, space is reserved in the memory for measures such as the quality of each sample. If the Z value of two samples are similar, the sample processor gives preference to the better sample. The quality of the sample is derived differently according to the scene. In the context of imperfect registration characteristic most if not all current depth-image acquisition devices, better results may be obtained when the samples of one sampling location are consistently selected and when the additional samples from other images are used merely to fill in gaps. Synthetic data simulates perfect registration and the quality of the samples was derived from the interpolation factor of the tile it belonged to: the closer the interpolation factor was to 2×2, the higher the quality 5.

A 128-bit wide memory interface provides read/write access to all three buffers in parallel. Each sample processor processes a sample every two clock cycles. This is the maximum possible rate, since two region buffer accesses (1 read and 1 write) are required for each sample. The sample processor may be pipelined, so that each computation has several cycles to execute, while sustaining the rate of a sample every two clock cycles. Thus four sample processors are capable of handling an aggregate rate of two samples per clock cycle, or 600 million samples/sec at 300 MHZ. A back buffer outputs samples from the previous region to the Reconstruction Buffer, via a shift path that spans all 4 partitions of the Region Accumulator. A small fraction of memory cycles are stolen from the Sample Processors, to feed this scan-out path.

Reconstruction Buffer

The reconstruction buffer accepts the stream of final warped sub-sample values from the region accumulator, and filters them to produce final pixel values for the 128×128 pixel region. The reconstruction buffer includes two scan-line-sized accumulators, and four simple processors. For each RGB/Offset/Present value, each color component is multiplied by a weight from the filtering kernel and added to a sum. Normalization by the sum of weights (see equation (3)) produces the final pixel value, which is output from the ASIC to the frame buffer. The filter kernel (preferable a raised cosine) is 2×2 pixels in size, with 4×4 sub-pixel resolution. The two 2-bit offset values select the proper kernel element within each sub-pixel.

Frame Buffer

The frame buffer is a straightforward assembly of commodity DRAMs and programmable parts. It must absorb the full bandwidth of the reconstruction buffers on all nodes, so the peak output rate of the nodes must be tuned to avoid over-running the frame buffer.

Host and Software

In the preferred arrangement, the host is responsible for determining which reference image tiles will be used to compute the current destination image, for sorting the tiles according to screen region, and for sending the tiles to the various WarpEngine nodes. The host must also determine the interpolation factor for each chosen tile and send instructions to control the warping and interpolation. It will be understood that these instructions are cached in the tile caches and should not represent a significant computational or bandwidth burden for the host.

Retained Mode Operation

Recall that the WarpEngine may operate in either a retained mode, in which there is a fixed set of reference images describing an environment, or in an immediate mode, in which new reference images are being received in real-time. In the retained mode all reference images are available beforehand. Because the depth discontinuities in the reference images do not depend on the desired view, surface connectivity may be estimated as a pre-processing function. This frees the warp array of an additional task at the price of a few additional connectivity bits per reference image sample. Determining which tiles are needed for the current image begins with choosing the tiles that are visible. This is done efficiently by subdividing each reference image down to 16×16 tiles in quad-tree fashion, and then recursively testing whether rectangular sub-images of the image are visible. The visibility test itself is identical to the bucket sorting of tiles. For example, the four corners of the sub-image are warped with first the minimum, and then the maximum disparity δ of the sub-image. The bounding box of the eight resulting points is a conservative estimate of the screen area covered by the sub-image. If the sub-image is a tile (i.e., a leaf in the quad-tree) it is also assigned to the appropriate screen region bins.

Depending on the scene, a large number of tiles can be visible and warping all of them is inefficient. Not all visible tiles are needed for the current frame since some tiles sample the same surfaces. Choosing among the visible tiles is not a trivial task. First one needs to determine which tiles sample the same surfaces and then choose among the several candidate tiles according to a quality metric.

A preferred approach approximates each visible tile by two triangles. The triangles are transformed, projected and scan-converted according to the desired view. The Z-buffer test is fuzzy and when two samples are close, the sample that belongs to a better tile is selected. A better tile is a tile whose approximating triangles have a desired image size closer to 16×16, which implies a reference image sampling close to the destination image sampling. After all visible tiles are processed, the chosen tiles are the tiles that have at least one sample left in the tile choosing buffer.

Next, the host needs to determine the interpolation factor for each chosen tile. Recall that the ideal interpolation factor is the minimum value for which surface continuity is preserved. We first find the maximum changes in disparity along each direction, then we use them to estimate the maximum screen-space distance between two neighboring samples. The maximum one-pixel disparity variation is computed as a pre-process, taking into consideration depth discontinuities.

Frame-to-frame coherence may be exploited to minimize bandwidth requirements by storing each rendered tile in the tile cache of the WarpEngine node that rendered the tile. A large percentage of these tiles can then be used in rendering the same region for the next frame, and many of the remaining tile can be redistributed using the network interface and used by other WarpEngine nodes for other regions. Only a relatively small percentage of the tiles will need to be sent from the host. Indeed, with a modest number of reference images, it should be possible to cache all the reference image tiles. A PC's AGP interface should provide sufficient bandwidth for sending missing tiles and pointers to cached tiles.

Immediate Mode Operation

For immediate-mode, frame-to-frame coherence cannot be utilized as effectively, since users may wander into areas of the environment that have not been previously sampled in reference images. Moreover, the environment itself may indeed be in flux (persons moving, for example). This means that bandwidth requirements from the host will be much higher. In the worst case, it may be necessary on each frame to send every tile from the host to the WarpEngine, and to render every tile.

The ability to perform real-time depth-image acquisition at better than VGA resolution is still quite a few years off in the future. An immediate-mode system with twenty WarpEngine nodes may be constructed that contains a full screen-sized warp buffer. This means that bucket sorting is not required. Similarly, the relatively low-resolution VGA requirements yields a manageable amount of data. If one data stream provides 640×480 pixels at 30 Hz, this would require 36,000 tiles/sec or 72 megabytes/sec to be processed. For an immediate mode system with four such data streams, a single high-end PC host with an AGP 4X Interface could handle routing tiles to the WarpEngine nodes. Silicon technology (for the WarpEngine ASIC) and interface technology (for data bandwidth) should scale as depth-image acquisition scales.

Another important difference between rendering in retained versus immediate mode is that the PEs will have to compute connectivity information real-time. This is not a serious performance loss, however, since the computation required is relatively simple enough—two additions and a compare operation for each of the four directions along which connectivity is estimated. A PE can easily obtain the disparities of the neighboring samples through the closest-neighbor communication paths. Also the host cannot approximate the interpolation factor as done in the retained mode since the tile information needed cannot be pre-computed.

A preferred solution is to let the warp array estimate the interpolation factor. After all PEs warp their sample, using the inter-PE paths, the Warp Array can determine the maximum distance between consecutive warped samples in both directions. This produces interpolation-factors that are close to ideal as is obtainable with retained mode rendering.

It will be appreciated that the steps of the methods illustrated above may be readily implemented either by software that is executed by a suitable processor or by hardware, such as an application-specific integrated circuit (ASIC).

The various aspects of the invention have been described in connection with a number of exemplary embodiments. To facilitate an understanding of the invention, many aspects of the invention were described in terms of sequences of actions that may be performed by elements of a computer system. For example, it will be recognized that in each of the embodiments, the various actions could be performed by specialized circuits (e.g., discrete logic gates interconnected to perform a specialized function), by program instructions being executed by one or more processors, or by a combination of both.

Moreover, the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic configured to" perform a described action, or alternatively as "logic that" performs a described action.

Various embodiments of Applicants' invention have been described, but it will be appreciated by those of ordinary skill in this art that these embodiments are merely illustrative and that many other embodiments are possible. The intended scope of the invention is set forth by the following claims, rather than the preceding description, and all variations that fall within the scope of the claims are intended to be embraced therein.

What is claimed is:

1. A method of rendering images, the method comprising the steps of:

segmenting at least one reference image in a reference image space into a plurality of tiles, each tile defined by a corresponding set of image samples;

determining the connectivity of each of the samples based on the relative curvature of a surface of the corresponding tile at the sample coordinates;

bi-linearly interpolating color and depth information between adjacent, connected samples to form a corresponding set of sub-samples;

warping the set of sub-samples from the reference image space to a destination image space; and computing a final pixel color for each of a plurality of groups of sub-samples in the destination image space as a weighted average of the color information of the sub-samples for each respective group;

wherein the final pixel colors are combined to render a final image in the destination image space from the at least one reference image.

2. The method of claim 1, further comprising the step of:

Z-buffering the set of sub-samples in the destination image space prior to computing a final pixel color.

3. The method of claim 1, wherein the relative curvature of the corresponding segment at the sample coordinates is calculated by computing a second derivative of a generalized disparity of the sample defined as the ratio of the distance between a viewing position of the at least one reference image and the plane of the at least one reference image and the distance perpendicular to the plane of the at least one reference image between the viewing position and the sample.

4. The method of claim 3, wherein the second derivative of the generalized disparity of the sample is computed along four directions in the plane of the at least one reference image at the sample coordinates, the four directions including an E-W, a SE-NW, a N-S, and a SW-NE direction.

5. The method of claim 3, wherein when the computed second derivative of the generalized disparity of the sample exceeds a predetermined threshold, the sample is not connected to form the final image in the destination image space.

6. The method of claim 1, wherein the step of bi-linearly interpolating between adjacent, connected samples comprises the steps of:

selecting a connected sample;

dividing a linear segment between the connected sample and an adjacent, connected sample to obtain at least one sub-sample;

repeatedly dividing linear segments between connected samples and adjacent connected samples, between connected samples and adjacent sub-samples, and between sub-samples and adjacent sub-samples to obtain subsamples until a desired interpolation distance between sub-samples is achieved;

wherein sub-samples are obtained at coordinates at or near the connected samples.

7. The method of claim 6, wherein each respective tile includes a plurality of quads, each quad defined by four adjacent, connected image samples.

8. The method of claim 7, wherein the desired interpolation distance between sub-samples is defined by an interpolation factor given by the equations:

$$ifu = [\sqrt{2} \max(V_0V_1, V_2V_3)],$$
$$ifv = [\sqrt{2} \max(V_0V_3, V_1V_2)]$$

where: $V_0$, $V_1$, $V_2$, and $V_3$ are the four adjacent, connected image samples;

$V_0V_1$, and $V_2V_3$ are boundary segments of a quad extending in a first direction, u;

$V_0V_3$ and $V_1V_2$ are boundary segments of the quad extending in a second direction, v; and ifu and ifv each represent the optimal interpolation factors in the u and v directions, respectively.

9. The method of claim 1, wherein the set of sub-samples are warped from the reference image space to the destination image space according to the equation:

$$u_2 = \frac{w_{11} + w_{12} + u_1 + w_{13} + v_1 + w_{14} \cdot \delta(u_1, v_1)}{w_{31} + w_{32} + u_1 + w_{33} + v_1 + w_{34} \cdot \delta(u_1, v_1)},$$

$$v_2 = \frac{w_{21} + w_{22} + u_1 + w_{23} + v_1 + w_{24} \cdot \delta(u_1, v_1)}{w_{31} + w_{32} + u_1 + w_{33} + v_1 + w_{34} \cdot \delta(u_1, v_1)}$$

where: $u_2$, $v_2$ are coordinates of a sub-sample in the destination image space;

$u_1$, $v_1$ are coordinates of the sub-sample in the reference image space;

$w_{xy}$ are transformation constants between the reference image space and the destination image space; and $\delta(u_1, v_1)$ is a generalized disparity at sub-sample $(u_1, v_1)$, defined as the ratio of the distance between a viewing position of the at least one reference image and the plane of the at least one reference image and the distance perpendicular to the plane of the at least one reference image between the viewing position and the sub-sample.

10. The method of claim 1, wherein the set of sub-samples are warped from the reference image space to the destination image space into a warp buffer having at least two sub-sample locations for each of the two directions defining the destination image plane for each final image pixel.

11. The method of claim 10, wherein each of the warped sub-samples is stored in a respective location of the warp buffer with a pair of offset values of at least two bits each to further define the location of a sub-sample within the warp buffer location.

12. The method of claim 11, wherein the weighted average is computed by the equation:

$$\frac{\sum_{i=1}^{n} S_i \cdot w_i}{\sum_{i=1}^{n} w_i}$$

where: $S_i$ define the color information for each sub-sample of a respective group of sub-samples; and $w_i$ are weights used to define the relative contribution of the color information of each sub-sample to the final computed pixel color based on the offset values stored with the sub-sample.

13. The method of claim 12, wherein sub-samples having offset values defining locations closer to the center of a final image pixel are assigned weights that provide a greater relative contribution of the sub-sample's color information to the final computed pixel color.

14. The method of claim 13, wherein each of the plurality of groups of sub-samples includes sub-samples located in the warp buffer within at least one pixel of a respective final image pixel.

15. The method of claim 13, wherein the weights used to define the relative contribution of the color information are defined by a function having a relatively smaller value at the corner of a two-by-two pixel neighborhood centered at a respective final image pixel, and increasing in value to reach a maximum value at the center of the respective final image pixel.

16. The method of claim 15, wherein the function is a raised cosine function having zeroes placed at the corner of a two-by-two pixel neighborhood.

17. A method of rendering images, the method comprising the steps of:

segmenting at least one reference image in a reference image space into a plurality of tiles, each tile defined by a corresponding set of image samples;

determining the connectivity of each of the samples based on the relative curvature of a surface of the corresponding tile at the sample coordinates;

warping the set of samples from the reference image space to a destination image space;

bi-linearly interpolating color and depth information between adjacent, connected warped samples to form a corresponding set of sub-samples; and computing a final pixel color for each of a plurality of groups of sub-samples in the destination image space as a weighted average of the color information of the sub-samples for each respective group;

wherein the final pixel colors are combined to render a final image in the destination image space from the at least one reference image.

18. The method of claim 17, further comprising the step of:

Z-buffering the set of sub-samples prior to computing a final pixel color.

19. The method of claim 17, wherein the relative curvature of the corresponding segment at the sample coordinates is calculated by computing a second derivative of a generalized disparity of the sample defined as the ratio of the a distance between a viewing position of the at least one reference image and the plane of the at least one reference image and the distance perpendicular to the plane of the at least one reference image between the viewing position and the sample.

20. The method of claim 19, wherein the second derivative of the generalized disparity of the sample is computed along four directions in the plane of the at least one reference image at the sample coordinates, the four directions including an E-W, a SE-NW, a N-S, and a SW-NE direction.

21. The method of claim 19, wherein when the computed second derivative of the generalized disparity of the sample exceeds a predetermined threshold, the sample is not connected to form the final image in the destination image space.

22. The method of claim 17, wherein the step of bi-linearly interpolating between adjacent, connected samples comprises the steps of:
- selecting a connected sample;
- dividing a linear segment between the connected sample and an adjacent, connected sample to obtain at least one sub-sample;
- repeatedly dividing linear segments between connected samples and adjacent connected samples, between connected samples and adjacent sub-samples, and between sub-samples and adjacent sub-samples to obtain sub-samples until an optimal interpolation distance between sub-samples is achieved;
- wherein sub-samples are obtained at coordinates at or near the connected samples.

23. The method of claim 22, wherein each respective tile includes a plurality of quads, each quad defined by four adjacent, connected image samples.

24. The method of claim 23, wherein the optimal interpolation distance between sub-samples is defined by an interpolation factor given by the equations:

$$ifu = \lceil \sqrt{2} \max(V_0 V_1, V_2 V_3) \rceil,$$
$$ifv = \lceil \sqrt{2} \max(V_0 V_3, V_1 V_2) \rceil$$

where: $V_0$, $V_1$, $V_2$, and $V_3$ are the four adjacent, connected image samples;
$V_0 V_1$, and $V_2 V_3$ are boundary segments of a quad extending in a first direction, u;
$V_0 V_3$ and $V_1 V_2$ are boundary segments of the quad extending in a second direction, v; and
ifu and ifv each represent the optimal interpolation factors in the u and v directions, respectively.

25. The method of claim 17, wherein the set of samples are warped from the reference image space to the destination image space according to the equation:

$$u_2 = \frac{w_{11} + w_{12} + u_1 + w_{13} + v_1 + w_{14} \cdot \delta(u_1, v_1)}{w_{31} + w_{32} + u_1 + w_{33} + v_1 + w_{34} \cdot \delta(u_1, v_1)},$$

$$v_2 = \frac{w_{21} + w_{22} + u_1 + w_{23} + v_1 + w_{24} \cdot \delta(u_1, v_1)}{w_{31} + w_{32} + u_1 + w_{33} + v_1 + w_{34} \cdot \delta(u_1, v_1)}$$

where: $u_2$, $v_2$ are coordinates of a sub-sample in the destination image space;
$u_1$, $v_1$ are coordinates of the sub-sample in the reference image space;
$w_{xy}$ are transformation constants between the reference image space and the destination image space; and
$\delta(u_1, v_1)$ is a generalized disparity at sample $(u_1, v_1)$, defined as the ratio of the distance between a viewing position of the at least one reference image and the plane of the at least one reference image and the distance perpendicular to the plane of the at least one reference image between the viewing position and the sub-sample.

26. The method of claim 17, wherein the set of sub-samples are stored into a warp buffer having at least two sub-sample locations for each of the two directions defining the destination image plane for each final image pixel.

27. The method of claim 26, wherein each of the sub-samples is stored in a respective location of the warp buffer with a pair of offset values of at least two bits each to further define the location of a sub-sample within the warp buffer.

28. The method of claim 27, wherein the weighted average is computed by the equation:

$$\frac{\sum_{i=1}^{n} S_i \cdot w_i}{\sum_{i=1}^{n} w_i}$$

where: $S_i$ define the color information for each sub-sample of a respective group of sub-samples; and
$w_i$ are weights used to define the relative contribution of the color information of each sub-sample to the final computed pixel color based on the offset values stored with the sub-sample.

29. The method of claim 28, wherein sub-samples having offset values defining locations closer to the center of a final image pixel are assigned weights that provide a greater relative contribution of the sub-sample's color information to the final computed pixel color.

30. The method of claim 29, wherein each of the plurality of groups of sub-samples includes sub-samples located in the warp buffer within at least one pixel of a respective final image pixel.

31. The method of claim 29, wherein the weights used to define the relative contribution of the color information are defined by a function having a relatively smaller value at the corner of a two-by-two pixel neighborhood centered at a respective final image pixel, and increasing in value to reach a maximum value at the center of the respective final image pixel.

32. The method of claim 31, wherein the function is a raised cosine function having zeroes placed at the corner of a two-by-two pixel neighborhood.

33. An apparatus for rendering images, the apparatus comprising:
- at least one node having an ASIC and a tile cache; the ASIC including
- a warp array for warping and interpolating reference image samples;
- a region accumulator having a double-buffered warp buffer for resolving visibility;
- a reconstruction buffer for computing final pixel values; and
- a network interface capable of connecting the at least one node to other nodes in a high-bandwidth ring;
- wherein the least one node computes final pixel values of an image from the image samples of a respective tile of at least one reference image.

34. The apparatus of claim 33, wherein the warp array comprises:
- a plurality of processing elements arranged as a pixel array; each processing element including:
  - a simple byte-wide arithmetic logic unit (ALU); and
  - memory partitioned into main memory, an I/O buffer, and a sample buffer; and
- a distributed linear expression for computing a linear portion of a set of 3D warping equations.

35. The apparatus of claim 33, wherein the region accumulator comprises:
- an SRAM warp buffer;
- a set of four sample processors that combine warped samples into the warp buffer memory; and
- a pair of double-buffered fields for storing RGB values and offsets used for reconstruction.

* * * * *